(12) United States Patent
Yu et al.

(10) Patent No.: US 7,707,795 B2
(45) Date of Patent: May 4, 2010

(54) WALL PANEL WITH GUSSETED OPEN FRAME

(75) Inventors: Shawn Yu, Hudsonville, MI (US); Bryan Gingrich, Holland, MI (US)

(73) Assignee: Haworth, Inc., Holland, MI (US)

( * ) Notice: Subject to any disclaimer, the term of this patent is extended or adjusted under 35 U.S.C. 154(b) by 372 days.

(21) Appl. No.: 11/595,123

(22) Filed: Nov. 9, 2006

(65) Prior Publication Data
US 2008/0110112 A1     May 15, 2008

(51) Int. Cl.
*E04C 2/38* (2006.01)
(52) U.S. Cl. ................. 52/657; 52/655.1; 52/656.8; 403/402
(58) Field of Classification Search ................. 52/657, 52/239, 481.1, 481.2, 655.1, 656.1, 656.9; 403/252, 255, 402; 248/220.1, 220.21
See application file for complete search history.

(56) References Cited

U.S. PATENT DOCUMENTS

| | | | |
|---|---|---|---|
| 891,604 A | 6/1908 | Diamond | |
| 953,680 A | 4/1910 | Baker | |
| 977,609 A * | 12/1910 | Freeman | 248/243 |
| 1,029,467 A | 6/1912 | Schaffert | |
| 2,280,361 A | 4/1942 | Ackerman | |
| 2,321,391 A | 6/1943 | Kamin | |
| 3,263,385 A * | 8/1966 | Pauls | 52/461 |
| 3,456,970 A * | 7/1969 | Sunasky | 403/319 |
| 3,669,479 A | 6/1972 | Payne | |
| 3,722,157 A * | 3/1973 | Prokop | 52/481.2 |
| 3,844,079 A * | 10/1974 | Karrip | 174/497 |
| 4,053,245 A | 10/1977 | Wright | |
| 4,064,996 A * | 12/1977 | Shillum | 211/191 |
| 4,069,638 A | 1/1978 | Hasselqvist et al. | |
| 4,072,433 A | 2/1978 | Veyhl | |
| 4,193,233 A * | 3/1980 | VandenHoek et al. | 52/126.4 |
| 4,342,397 A | 8/1982 | Halstrick | |
| 4,592,672 A * | 6/1986 | Ruch, Jr. | 403/205 |
| 4,700,959 A * | 10/1987 | Lars | 280/79.11 |
| 4,796,541 A * | 1/1989 | Halstrick | 108/107 |
| 5,116,161 A | 5/1992 | Faisst | |
| 5,495,952 A * | 3/1996 | Kainz | 211/90.04 |
| 5,535,898 A | 7/1996 | Burgess, Sr. et al. | |
| 5,664,380 A * | 9/1997 | Hsueh | 52/126.4 |
| 5,778,612 A | 7/1998 | Kissinger et al. | |
| 5,899,035 A * | 5/1999 | Waalkes et al. | 52/239 |
| 6,032,980 A | 3/2000 | Rapp et al. | |
| 6,134,845 A * | 10/2000 | Shipman et al. | 52/36.4 |
| 6,141,926 A | 11/2000 | Rossiter et al. | |
| 6,240,687 B1 | 6/2001 | Chong | |
| 6,301,846 B1 * | 10/2001 | Waalkes et al. | 52/239 |
| 6,684,929 B2 * | 2/2004 | MacDonald et al. | 160/135 |
| 6,748,997 B2 * | 6/2004 | Fricano et al. | 160/135 |
| 6,920,831 B2 * | 7/2005 | Lin | 108/107 |
| 7,051,482 B2 * | 5/2006 | MacDonald et al. | 52/239 |

FOREIGN PATENT DOCUMENTS

GB     2205378 A  *  12/1988

* cited by examiner

*Primary Examiner*—Jeanette E Chapman
*Assistant Examiner*—Daniel Kenny
(74) *Attorney, Agent, or Firm*—Flynn, Thiel, Boutell & Tanis, P.C.

(57) ABSTRACT

An upright space-dividing wall panel having an inner rigid frame. The frame is of an open ring-shaped construction utilizing detachable corner gusset structures for rigidly joining the transverse frame rails together, thereby providing the frame with a high degree of flexibility with respect to assembly thereof.

25 Claims, 22 Drawing Sheets

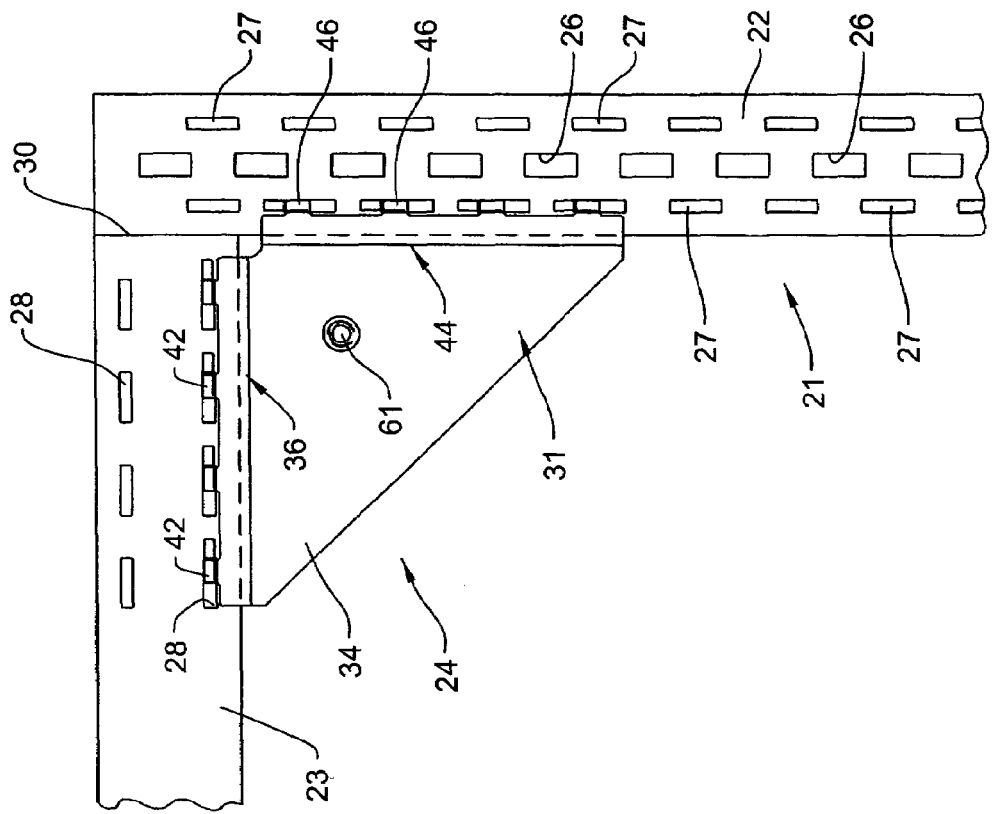
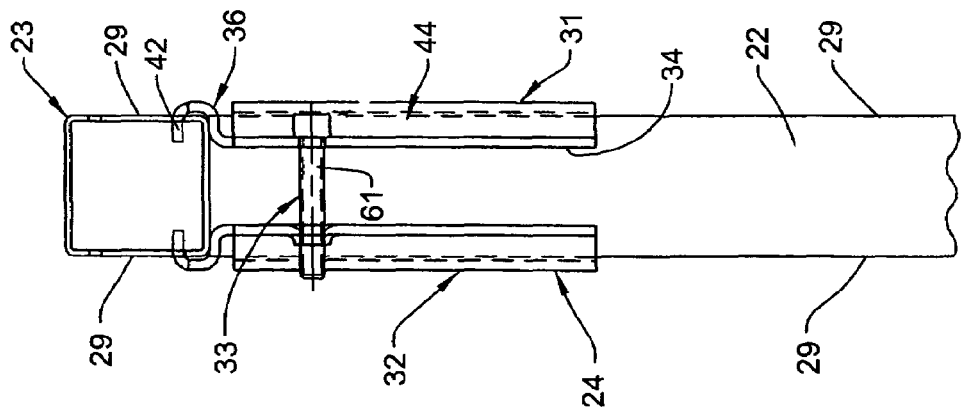

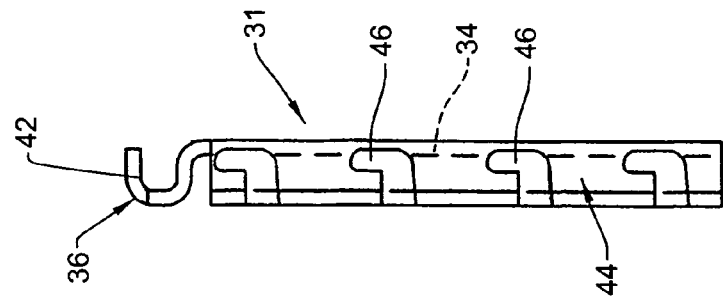
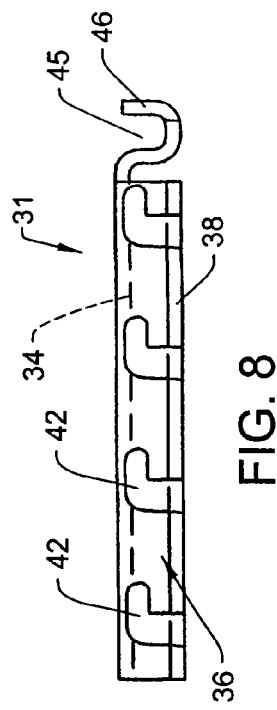
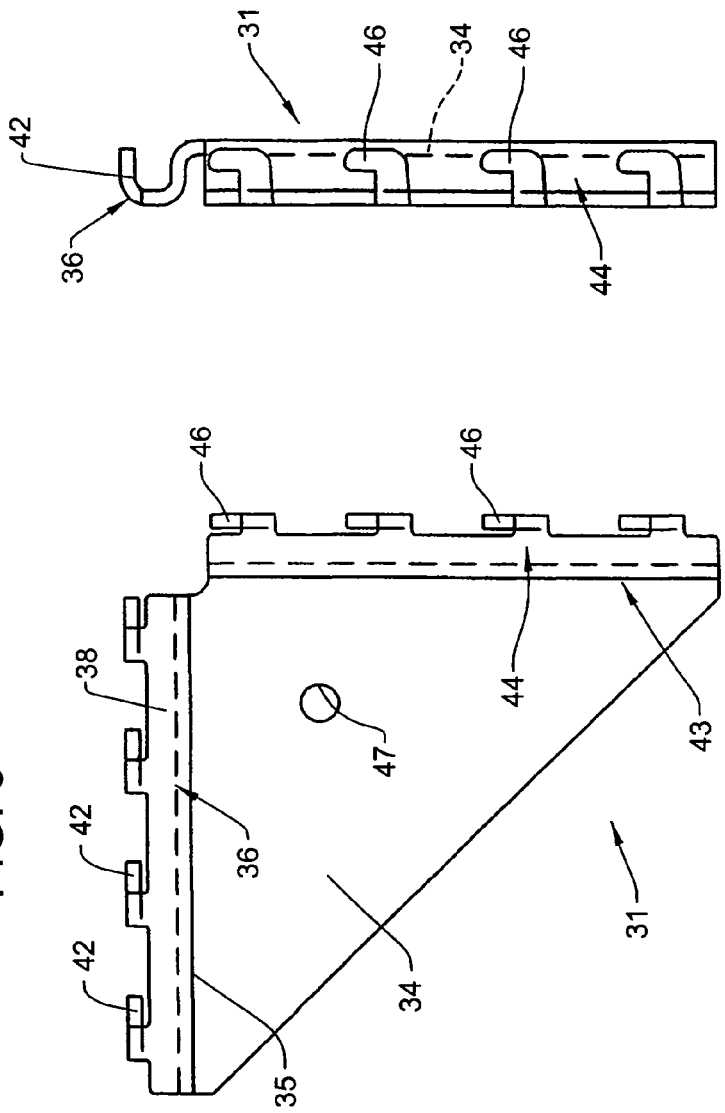
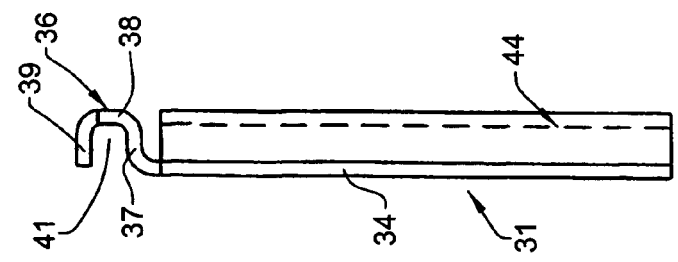

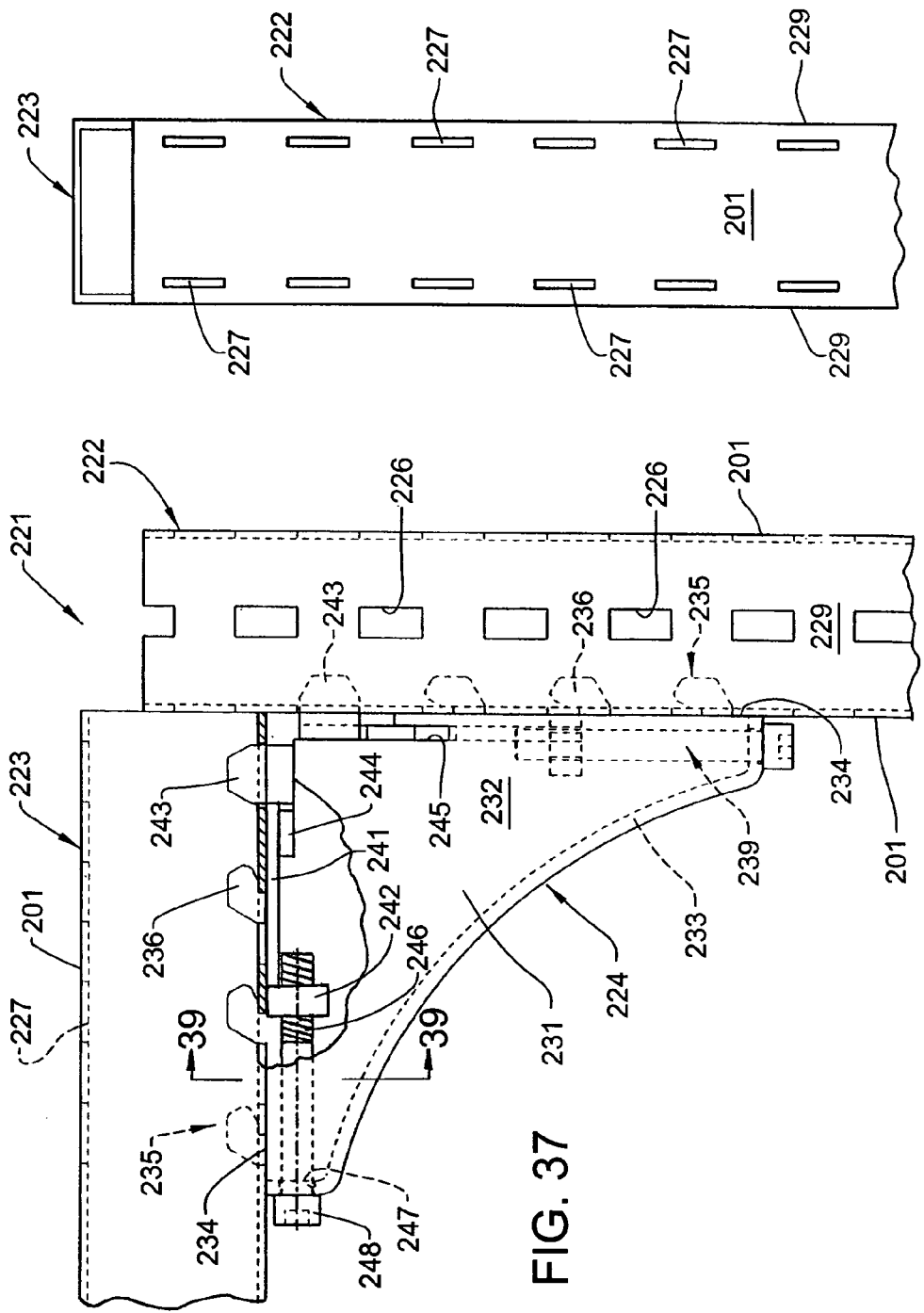

WALL PANEL WITH GUSSETED OPEN FRAME

FIELD OF THE INVENTION

This invention relates to upright wall panels associated with an interior space-dividing wall and, more specifically, to an improved frame construction for such wall panel.

BACKGROUND OF THE INVENTION

Prefabricated upright wall panels which serially connect in aligned and/or transverse relation for defining interior space-dividing walls are extensively utilized, particularly in offices and the like, for dividing large areas into smaller working areas. Such upright wall panels, in one conventional construction, employ an interior frame which is frequently a hollow ring-shaped rectangle which is defined by top and bottom horizontal frame elements or rails which extend between and are rigidly joined, typically by welding, to adjacent ends of a pair of upright frame rails. The interior frame is typically covered on the exterior side faces thereof by one or more cover pads, the latter being permanently or detachably carried on the frame. While panels employing a rigid interior frame defined by frame rails which are permanently fixed to one another, for example welded to one another, provide a durable construction, nevertheless such construction is suitable solely for manufacture at the factory, and is not suitable for a construction wherein the wall panels can be shipped in a knock-down condition and then assembled at the job site. Further, such rigid frame constructions do not readily permit features of the wall panel, such as the panel width, to be readily modified or adapted at the job site.

Further, in constructions involving separate corner structures for joining transverse rails or frame members together, the joining structures have lacked desired structural rigidity and/or convenience of use.

Examples of known constructions are illustrated by U.S. Pat. Nos. 2,280,361, 2,321,391, 3,669,479, 4,069,638, 4,072,433, 5,116,161, 5,535,898, 5,778,612 and 6,032,980.

Accordingly, it is an object of this invention to provide an improved upright space-dividing wall panel, and specifically an inner rigid frame for such panel, which frame is of an open ring-shaped construction utilizing detachable corner gusset structures for rigidly joining the transverse frame rails together, whereby the frame provides a high degree of flexibility with respect to permitting assembly of the frame and of the wall panel either in the factory or at the job site. The frame in addition permits the panel to be more readily modified at the job site by permitting disassembly of the frame and modification thereof if desired.

In the improved wall panel frame of the present invention, the frame utilizes detachable gussets which cooperate with the joined frame rails so as to exert pressure which tends to draw the frame rails together and into engagement with the gusset during application and securement of the gusset to the rails, thereby resulting in a frame having a high degree of strength and rigidity, while at the same time avoiding the use of permanent connections such as welding and the like.

Other objects and purposes of the invention will be apparent to persons familiar with constructions of this general type upon reading the following specification and inspecting the accompanying drawings.

BRIEF DESCRIPTION OF THE DRAWINGS

FIG. 3 is an enlarged fragmentary view which illustrates one corner, i.e. the upper right corner, of the frame shown in FIG. 2 and illustrates the gusset structure and its attachment to the transverse frame rails according to the first embodiment.

FIG. 4 is an elevational view taken from the left side of FIG. 3.

FIG. 5 is a side view showing a first gusset member as associated with the gusset arrangement of FIG. 3.

FIG. 6 is a right side elevational view of the gusset member shown in FIG. 5.

FIG. 7 is a left side elevational view of the gusset member shown in FIG. 5.

FIG. 8 is a top view of the gusset member shown in FIG. 5.

FIG. 37 is a view similar to FIG. 3 but illustrating a still further embodiment of a panel frame according to the present invention.

FIG. 38 is an exploded perspective view of the gusset structure associated with the frame of FIG. 37.

Figure 1:
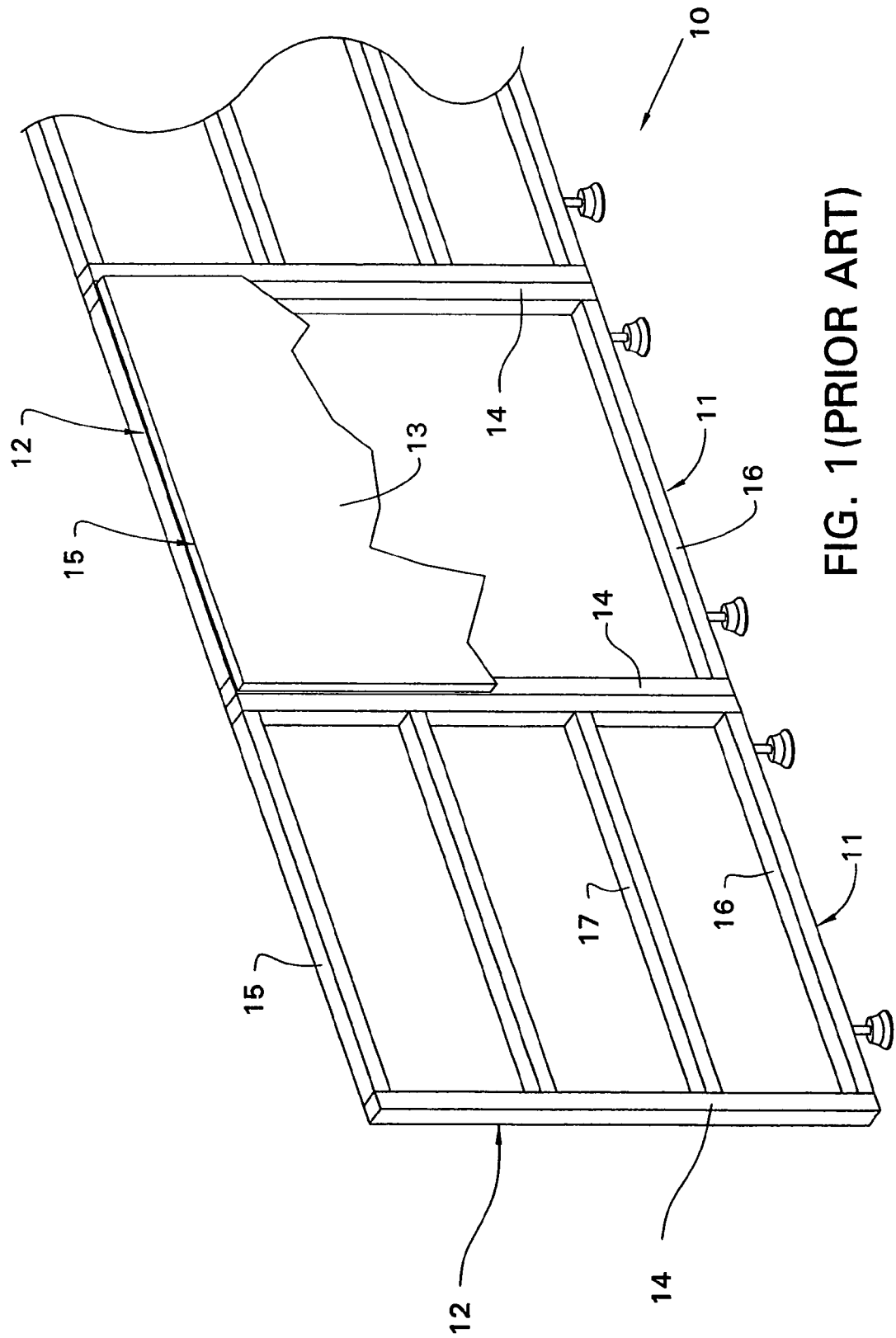
FIG. 1 is a fragmentary perspective view illustrating a generally conventional space-dividing interior wall and illustrating specifically the internal frames thereof.

Certain terminology will be used in the following description for convenience and reference only, and will not be limiting. For example, the words "upwardly", "downwardly", "rightwardly" and "leftwardly" will refer to directions in the drawings to which reference is made. The words "upward" or "top" will have reference to positions and directions associated with the upper portion of the panel frame when the wall panel is disposed in its normal upright use orientation, and similarly the words "downward" and "bottom" will have reference to locations and directions associated with the lower portion of the panel frame as normally disposed in close proximity to a supporting surface such as a floor. The words "inward" and "outward" will refer to directions toward and away from, respectively, the geometric center of the panel frame and designated parts thereof. Said terminology will include the words specifically mentioned, derivatives thereof, and words of similar import.

DETAILED DESCRIPTION

Figure 1A:
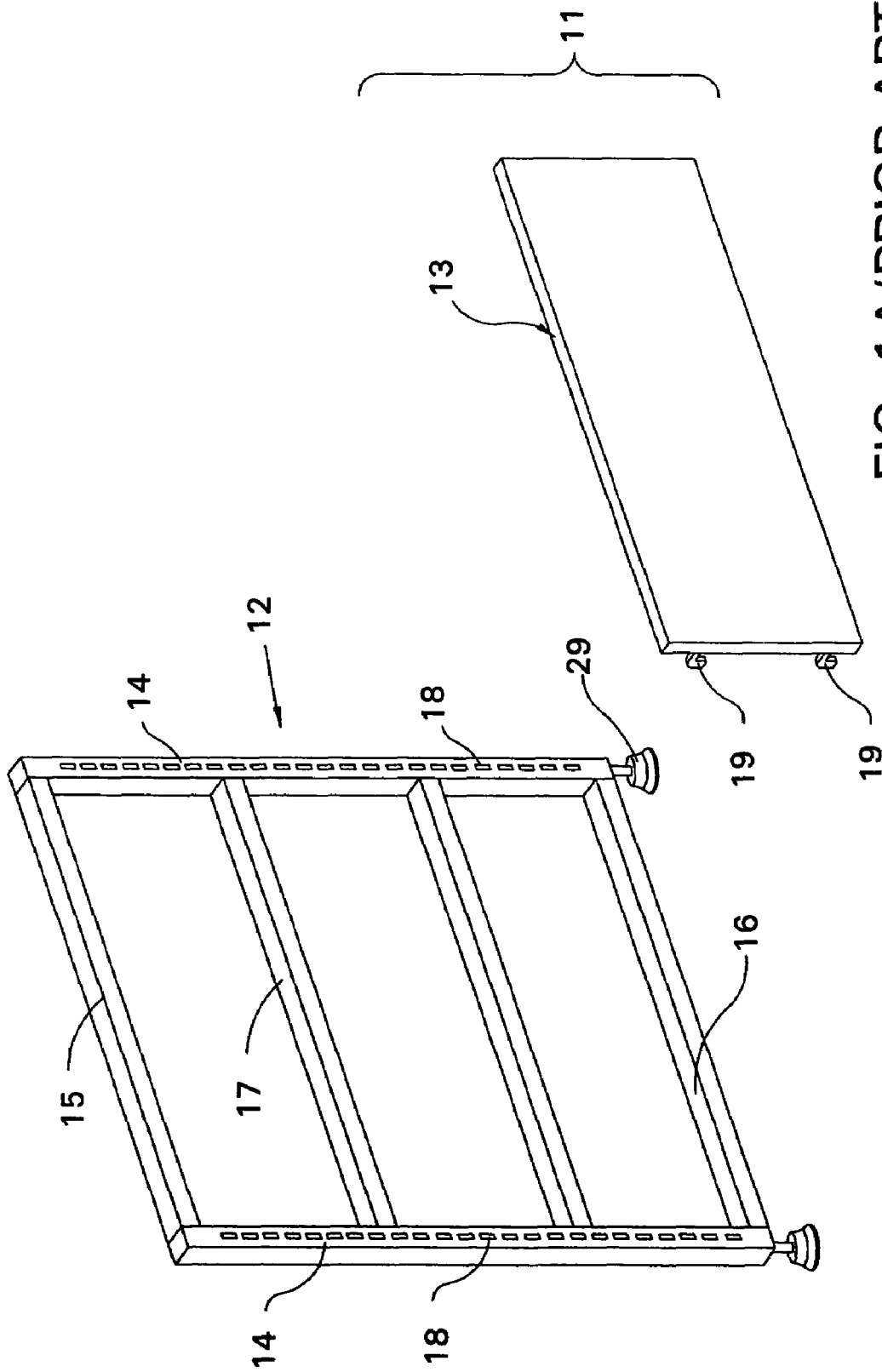
FIG. 1A is an exploded perspective view of a conventional space-dividing panel, such as a panel associated with the wall system of FIG. 1.

Referring to FIGS. 1 and 1A, there is diagrammatically illustrated a conventional construction as associated with an upright space-dividing interior wall system 10 as used in offices and the like. This wall system 10 is defined by a plurality of typically prefabricated upright wall panels 11 which can be disposed so that the edges serially connect together in either aligned or transverse relationship. The individual wall panels 11 are defined by a generally rigid interior frame 12 which in turn is covered on opposite side faces thereof by appropriate cover pads 13, the latter typically being releasably attached to the side faces of the frames and sized to occupy either the entire side face of the frame as illustrated by FIG. 1, or of smaller size so that a plurality of such cover pads are used to cover the individual frame as illustrated by FIG. 1A.

The rigid internal frame 12 typically has a generally rectangular ring-shaped upright profile, and the interior of the frame may be open or may be closed off with appropriate sound-absorbing materials such as fiberglass or the like. The frame 12 is typically defined by generally parallel side or edge frame members or rails 14 which project generally vertically, and they in turn are rigidly joined by generally parallel top and bottom frame members or rails 15 and 16 which extend in generally vertically spaced but parallel relationship. The adjacent ends of the horizontal and vertical frame members or rails are typically rigidly joined together, as by welding, in an effort to maximize strength and rigidity of the frame while maintaining suitable dimensional tolerances. The frame may have one or more intermediate horizontal frame members or rails 17 associated therewith, the latter typically being disposed vertically between the top and bottom rails, and positioned so that opposite ends thereof are joined to the upright rails 14 by either a permanent or releasable connection.

The frame uprights 14 are frequently provided with a plurality of vertically elongate slots 18 (FIG. 1A) formed in each exposed side face thereof, which slots 18 are disposed in a row which extends vertically along the exposed side face. The slots 18 are typically provided so as to releasably cooperate with fasteners 19, such as spring clips, hooks or the like, which are associated with the rear side of the cover pads 13 to permit the latter to be releasably attached to the exposed side faces of the uprights to permit closure of the frame side face. The slots 18 are also frequently utilized for accommodating therein hangers associated with accessories which mount on and protrude outwardly from the face of the wall panel.

The wall panel construction illustrated in FIGS. 1 and 1A, as briefly described above, utilizes a rigid frame. The present invention, as described hereinafter, relates to various embodiments of an improved open frame which can be utilized for constructing an upright wall panel having detachable cover pads attached to one or both side faces thereof. It will be appreciated that the attachment of cover pads to the frame is conventional, and accordingly the following description will relate principally to the construction of the improved open frame.

Figure 2:
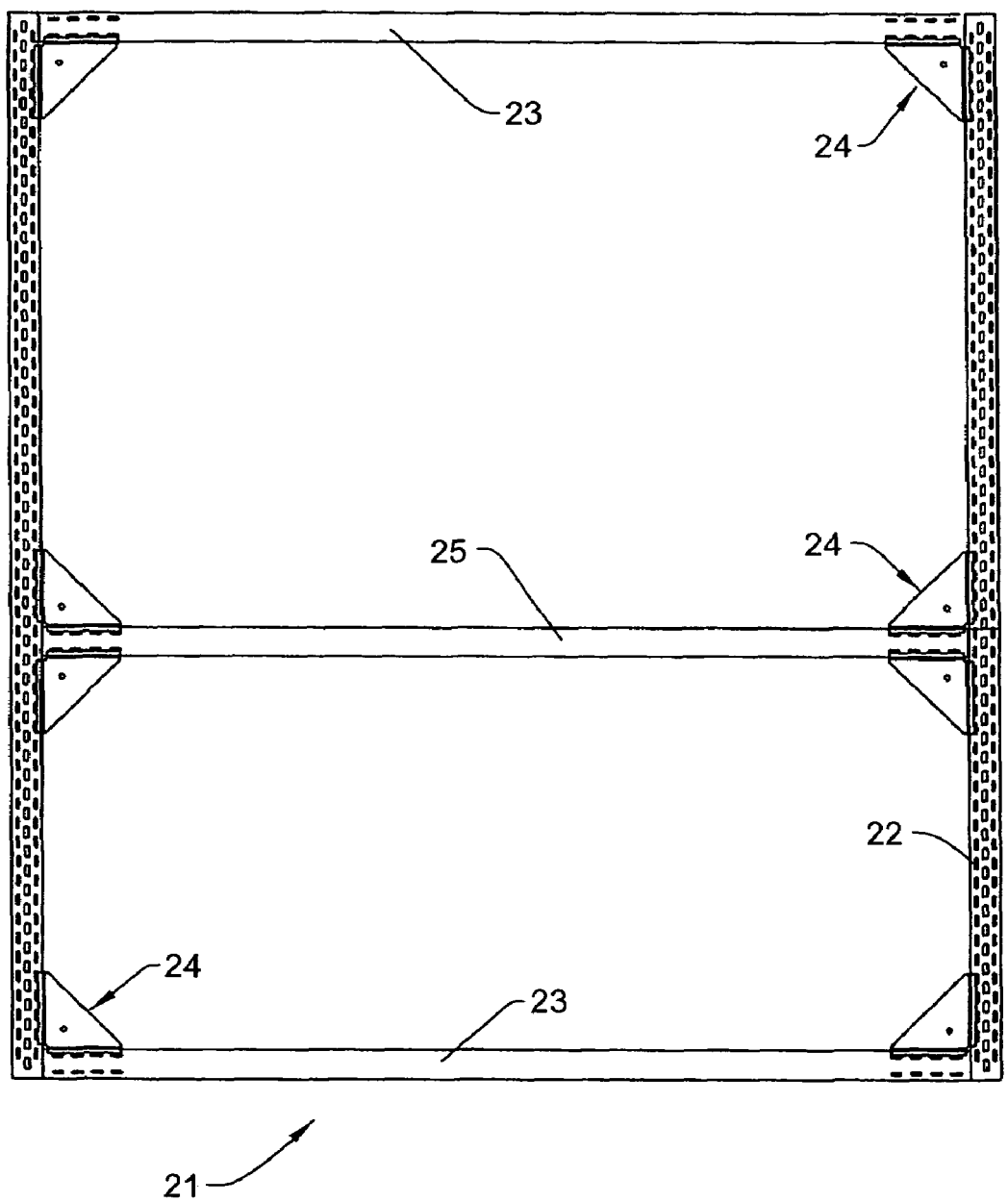
FIG. 2 is an elevational view of an improved panel frame constructed in accordance with a first embodiment of the present invention.

Referring specifically to FIG. 2, there is illustrated an improved, upright, ring-shaped rectangular frame 21 according to the present invention. This frame 21 is adapted, in a conventional manner, to mount, normally detachably, one or more cover pads (not shown) on each of the exposed side faces thereof so as to close-off and hence complete the construction of the upright wall panel. The construction of the cover pads, and the attachment thereof to the frame, can be conventional so that further description thereof is believed unnecessary.

The frame 21 is defined by a pair of generally parallel upright frame members or rails 22 which are sidewardly spaced apart and project generally vertically. These side or edge rails 22 in turn have their upper ends rigidly joined to a horizontally elongate top frame member or rail 23 which extends generally horizontally so as to project perpendicularly with respect to the side rails 22. The lower ends of the side rails 22 are similarly rigidly joined to a bottom cross-rail or frame member 23 which extends parallel with the top rail 23 to complete the rigid ring-shaped configuration of the frame.

The frame 21 may also be provided with one or more intermediate horizontally-extending cross frame members or rails 25, the latter extending parallel to the top and bottom rails 23 and being positioned vertically at a desired elevation therebetween.

The improved frame 21 of this invention has all of the transversely-intersecting rails, such as defined at each corner of the frame, provided with a detachable gusset structure 24 which rigidly but detachably engages both of the transversely intersecting frame rails and effects a simple but rigid securement therebetween. This gusset structure 24, as explained hereinafter, also preferably effects a drawing together of the transverse rails during attachment of the gusset structure thereto to provide the desired rigid securement between the rails while at the same time maintaining desired dimensional tolerances of the assembled frame.

The constructional details of the frame 21, specifically the rails 22-23 and the gusset structures 24, will now be described with reference to FIGS. 3-14.

The transverse rails 22 and 23 are preferably elongate hollow metal tubes having a rectangular, and preferably square cross-section as illustrated by FIG. 4. The opposite exposed side faces 29 of the upright rail 22 are each provided with a row of vertically elongate slots 26 extending along the upright centerline thereof. These slots 26 are typically provided to accommodate therein hooks or spring clips associated with the removable cover pads (not shown), although it will be appreciated that the slots 26 can also be utilized to accommodate hangers used to mount components such as work surfaces and the like adjacent the front face of the upright panel.

The upright rail 22 also has a pair of sidewardly spaced but generally parallel rows of slots 27 formed in each of the exposed side faces 29, which two rows of slots are identical and are uniformly spaced in sidewardly straddling relationship to the center row of slots 26. The slots 27 are provided so as to cooperate with the gusset structure 24 as described hereinafter.

The horizontal frame rail 23 is similarly constructed except that it is provided solely with two vertically spaced rows of elongate slots 28 extending horizontally thereof. The slots 28 associated with the rows formed in the horizontal rail 23 identically correspond in terms of size and spacing to the slots 27 associated with the upright rail 22. The rows of slots 28 may extend across the full width of the horizontal rail 23 if desired, but typically only a short row of slots 28, namely four slots in each row in the illustrated embodiment, is provided adjacent each free end of the horizontal rail 23. These slots 28 are also provided so as to cooperate with the gusset arrangement 24 as described hereinafter.

The rows of slots 27 formed in the upright edge rails 22 preferably extend throughout substantially the full vertical extent thereof so as to enable an intermediate cross-rail, such as the rail 25 in FIG. 2, to be attached to the frame at substantially any desired elevation therealong, whereby the horizontal rail can be attached to the uprights using the gusset structure 24, as described hereinafter.

Considering now the gusset structure 24, this embodiment is defined principally by three members, namely by first and second gusset members 31 and 32 respectively, and a connecting structure 33 which couples therebetween so as to hold the gusset members in secure clamping engagement with the transverse rails 22-23.

The first gusset member 31 (FIGS. 5-8) is defined by a generally flat triangular-shaped base plate 34 which, along one marginal edge 35 thereof, has a channel-shaped rail engagement structure 36 extending therealong. This rail engagement structure 36 is deformed transversely (i.e. sidewardly) relative to the plane of the base plate 34 so as to have a generally sidewardly-opening channel-shaped cross-section as illustrated by FIGS. 6-7. More specifically, this rail engagement structure 36 is defined by an inner leg 37 which is bent transversely from the base plate 34 generally along the edge 35. This inner leg 37 in turn joins through a further bend to a base leg 38, and it in turn joins through a further bend to an outer leg 39, the latter extending generally parallel to the inner leg 37. This channel-shaped structure hence defines a channel or groove 41 which extends lengthwise therealong and opens sidewardly relative to the base plate 34.

The outer leg 39 of the rail attachment structure 36 is specifically configured so as to be defined by a plurality of tabs 42 which are formed as L-shaped hooks 42, which hooks are cantilevered outwardly from the base leg 38 and are disposed in sidewardly spaced relation along the lengthwise extent of the rail attachment structure. The hooks 42, of which there are four in the illustrated embodiment, are disposed with the outer legs thereof all oriented in the same direction, which direction is oriented generally toward the apex of the triangular base plate 34.

The first gusset member 31 also has a further channel-shaped rail engagement structure 44 extending along the other marginal edge 43 thereof, which edge 43 extends in generally perpendicular relationship to the edge 35. This rail engagement structure 44 is identical in construction to the rail engagement structure 36 in that it is also a generally sidewardly-oriented channel-shaped structure defining therein a groove or channel 45 which opens sidewardly and extends lengthwise along the rail engaging structure. The outer leg of this rail engaging structure 44 is also defined by a plurality, here four, of tabs 46 formed as L-shaped hooks which are cantilevered transversely relative to the base plate 34. The hooks 46 are identical to the hooks 42 described above, and the outer legs thereof are all oriented in aligned relationship generally along a direction toward the apex of the base plate 34.

As is apparent from the drawings and the description as presented above, the rail engagement structures 36 and 44 are generally identical except that they substantially constitute mirror or reverse images of one another.

The first gusset member 31 also has an opening 47 extending transversely therethrough generally in a central region thereof.

Figure 9:
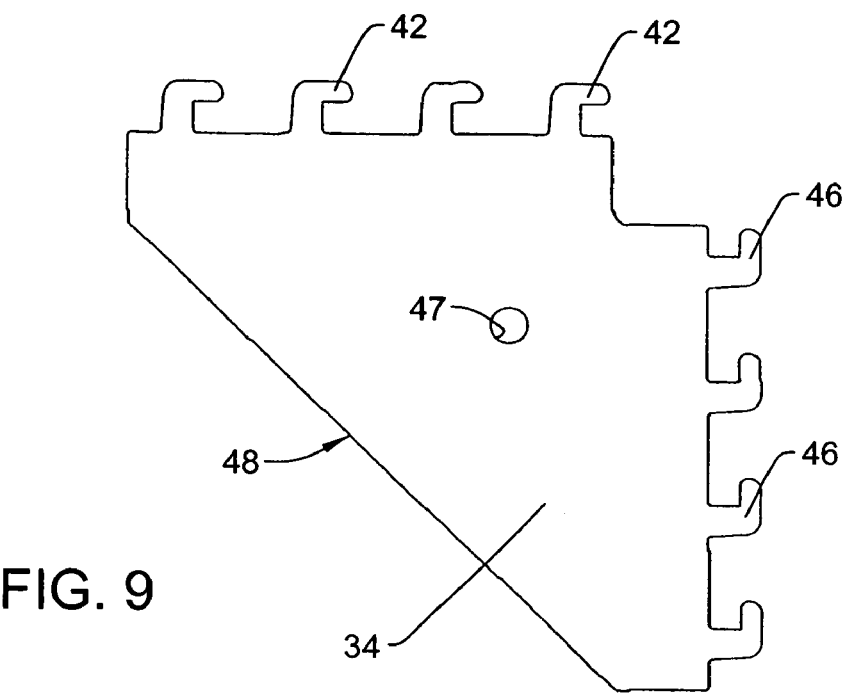
FIG. 9 is a side view of a flat plate which is deformed to create the gusset member of FIG. 5.
Figure 14:
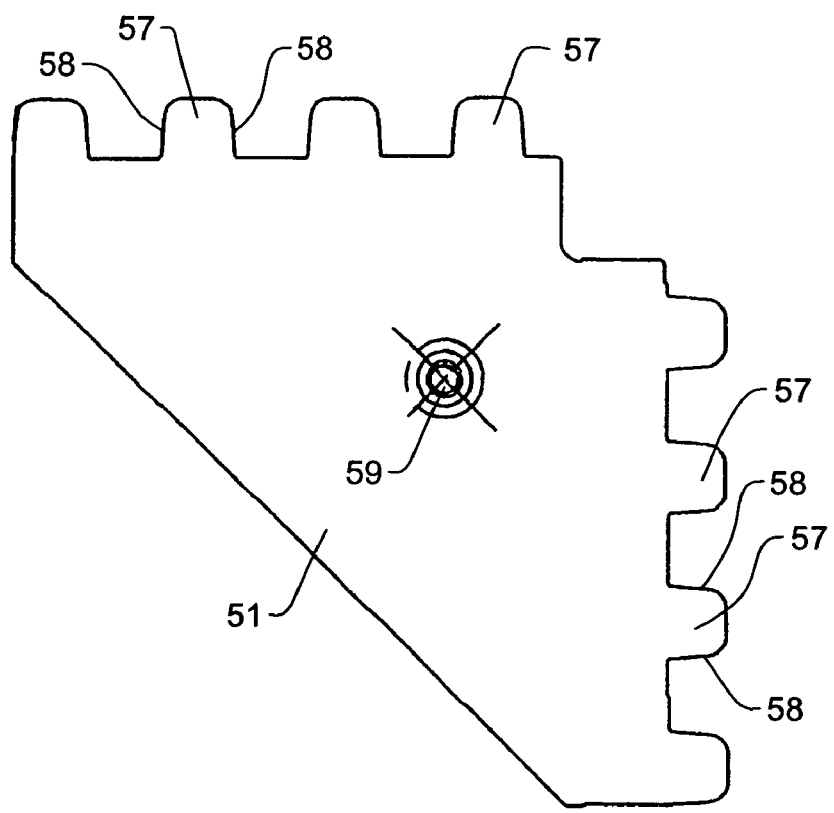
FIG. 14 is a side view showing a flat plate which is deformed to create the gusset member shown in FIG. 10.
Figure 11:
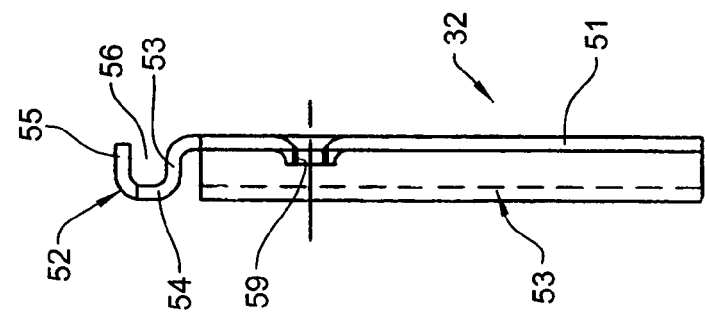
FIG. 11 is a right side elevational view of the gusset member shown in FIG. 10.
Figure 13:
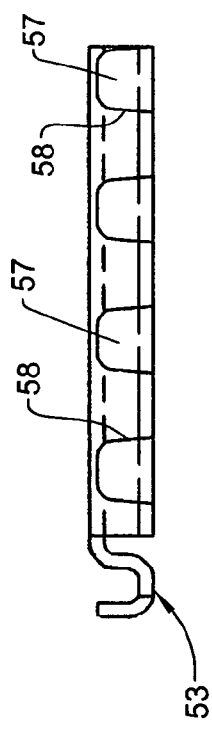
FIG. 13 is a top view of the gusset member shown in FIG. 10.
Figure 10:
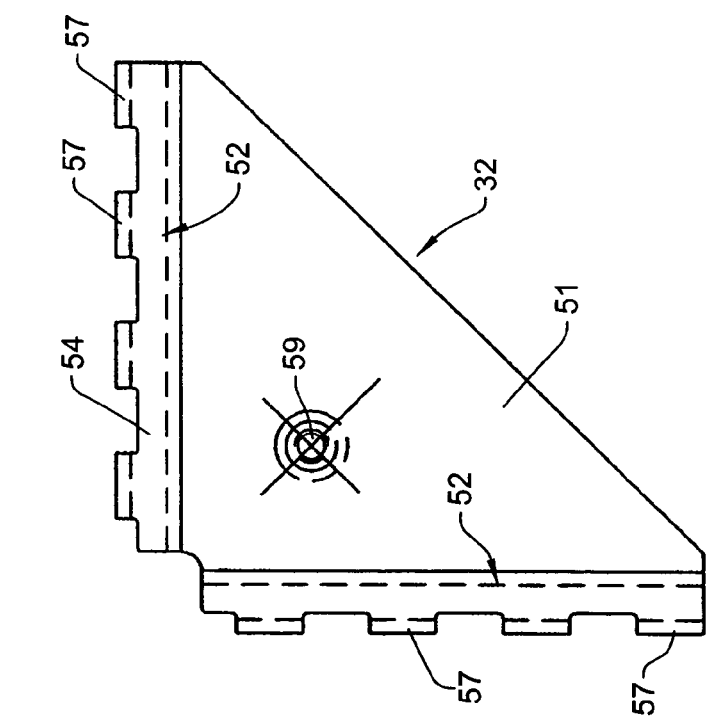
FIG. 10 is a side view which illustrates a second gusset member which, in cooperation with the first gusset member of FIG. 5, cooperates to create the gusset arrangement illustrated in FIG. 3.
Figure 12:
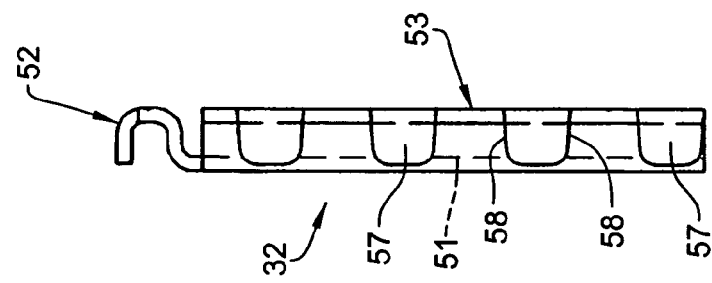
FIG. 12 is a left side elevational view of the gusset member shown in FIG. 10.

The gusset member 31 in the illustrated arrangement is preferably constructed by being initially punched or stamped from a flat metal sheet so as to effect formation of a flat metal blank 48 as illustrated in FIG. 9, which blank can be provided with the desired shape including the hooks 42 and 46. This blank 48 is thereafter subjected to a further pressing or stamping operation so as to effect forming of the channel-shaped structure which defines the rail engagement structures 36 and 44.

Considering now the second gusset member 32, and referring to FIGS. 10-13, this member is constructed similar to the first gusset member 31 in that it also includes a generally flat triangular-shaped base plate 51 having channel-shaped rail engagement structures 52 extending along the two transverse marginal edges thereof. Each of these rail attachment structures 52 is again defined by a generally sidewardly-opening channel having an inner leg 53 which is bent from the base plate 51 and projects sidewardly, which leg 53 is bent to define a bottom leg 54, which in turn is bent to define an outer leg 55 which extends generally parallel to the inner leg 53 and cooperates with it to define an open groove or channel 56 which projects sidewardly and extends lengthwise along the rail engagement structure. This construction of the rail engagement structure 52 is identical to the rail engagement structures 36 and 44 described above except that the structures 52 on gusset member 32 are not provided with transversely protruding hooks, but rather are provided with a plurality, here four, of sidewardly protruding tabs 57. More specifically, the tabs 57 are cantilevered sidewardly and are disposed in sidewardly spaced relationship lengthwise along the rail attachment structure. Each tab 57 preferably has the sides 58 thereof provided with a slight slope, whereby the opposite sides 58 of each tab slope or converge inwardly as they project toward the free end of the respective tab, thereby providing each tab with a truncated wedge-shaped configuration.

The gusset member 32 also has an opening 59 extending transversely through the middle region of the base plate 51, which opening 59 is intended to align with the opening 47 formed in the first gusset member 31. This opening 59, however, is preferably provided with an enlarged boss and is preferably internally threaded. Alternatively, the threads can be replaced by a threaded nut which is positioned in alignment with the opening 59 and is suitably fixed, as by being welded, to the base plate 51.

The gusset members 31 and 32 are joined together as illustrated in FIG. 4 by the connecting structure 33 which, in the illustrated embodiment, comprises a threaded fastener 61, specifically a screw. This fastener is adapted to have the shank thereof inserted through the opening 47 so that the head of the fastener abuts the base plate 34 of the gusset member 31, and the threaded shank in turn is rotatably threadably engaged within the threaded opening 59 associated with the adjacent gusset member 32, substantially as illustrated in FIG. 4.

In the construction of the gusset members 31 and 32, the hooks 42, 46 and the tabs 57 all protrude sidewardly in a direction which is substantially perpendicular with respect to the plane of the respective base plate 34 or 51. In addition, the length of the outer legs of the hooks 42, 46 are preferably slightly less than the length of the slots 27, 28 so as to enable the hooks to pass through the slots. Similarly the transverse width of the tabs 57 is selected so as to enable the tabs to penetrate transversely into the slots 27, 28, although the sloped sides 57 associated with at least one side of some of the tabs is positioned so as to create a wedge-type engagement with the end of the slot during assembly of the gusset structure to the frame rails. The sizing and spacing of the hooks and tabs is obviously determined so as to permit their proper cooperation with the slots 27, 28 as associated with the rails 22 and 23.

The joining of a pair of transverse frame rails 22 and 23 with the gusset structure 24, so as to define one corner of the frame substantially as illustrated by FIG. 2, will now be briefly described to ensure a complete understanding thereof.

The first gusset member 31 is initially assembled to the frame rails 22 and 23. First, the hooks 42 are inserted into the slots 28 of the horizontal frame rail 23, and the frame rail 23 is then slidably moved a small distance relative to the hooks so that the outer legs of the hooks seat under the side wall webs defined between adjacent slots, and this effects seating or bottoming out of the webs against the hooks. The other frame rail 22 is then positioned so as to engage the hooks 46 within the slots 27, and this rail 23 is then also moved a small extent (downwardly in FIG. 3) to cause the rail 22 to be firmly seated on the hooks 46.

The second gusset member 32 is then positioned adjacent the other side of the joined rails 22 and 23 in generally parallel relation to the first gusset member 31, and is moved transversely inwardly toward the opposed gusset member 31 so that the transversely protruding tabs 57 enter into the slots 27 and 28 associated with rails 22 and 23 respectively. The fastener or screw 61 is, after insertion through the opening 47 from the outer side thereof, is then threadably engaged within the threaded opening 59 associated with the gusset member 32. Continued rotation and hence tightening of the screw 61 draws the gusset member 32 inwardly toward the gusset member 31, thereby causing the tabs 57 to be forcibly inserted into the grooves 27, 28 provided adjacent the abutting ends of the rails 22 and 23. During this insertion of the tabs 57, if the horizontal rail 23 is not disposed with its end surface 30 abutted against the side of the upright rail 22, then the sloped sides 58 of the tabs 57 which penetrate the slots 28 on the horizontal rail 23 will react against the ends of the slots 27, and effect a wedging engagement therewith which will tend to effect at least limited displacement of the top rail 23 so that the end face 30 thereof is brought into snug abutting contact with the side of the upright rail 22. The rotation of the fastener 61 will be sufficient to ensure that both gusset members 31, 32 are snugly and tightly engaged with the rails, substantially as illustrated by FIG. 4, to create a rigid joining together of the rails 22 and 23 in perpendicular relationship to one another.

In similar fashion all transverse rails can be coupled by a gusset structure 24, including not only the corners of the frame, but also the coupling of the intermediate rails to the uprights of the frame, substantially as illustrated by FIG. 2.

Since each of the gusset members 31 and 32 is generally symmetrical about a line which extends from the apex of the gusset and bisects the flat base plate, it will be understood that the first gusset member 31 can be positioned adjacent either side of the transverse rails and, by suitable rotational orientation, be positioned for cooperation with the slots associated with the rails. In similar fashion, the other gusset plate 32, also due to its symmetry about a similar bisecting line, can also be positionally oriented so as to always cooperate with the opposite side of the cooperating rails.

Figure 15:
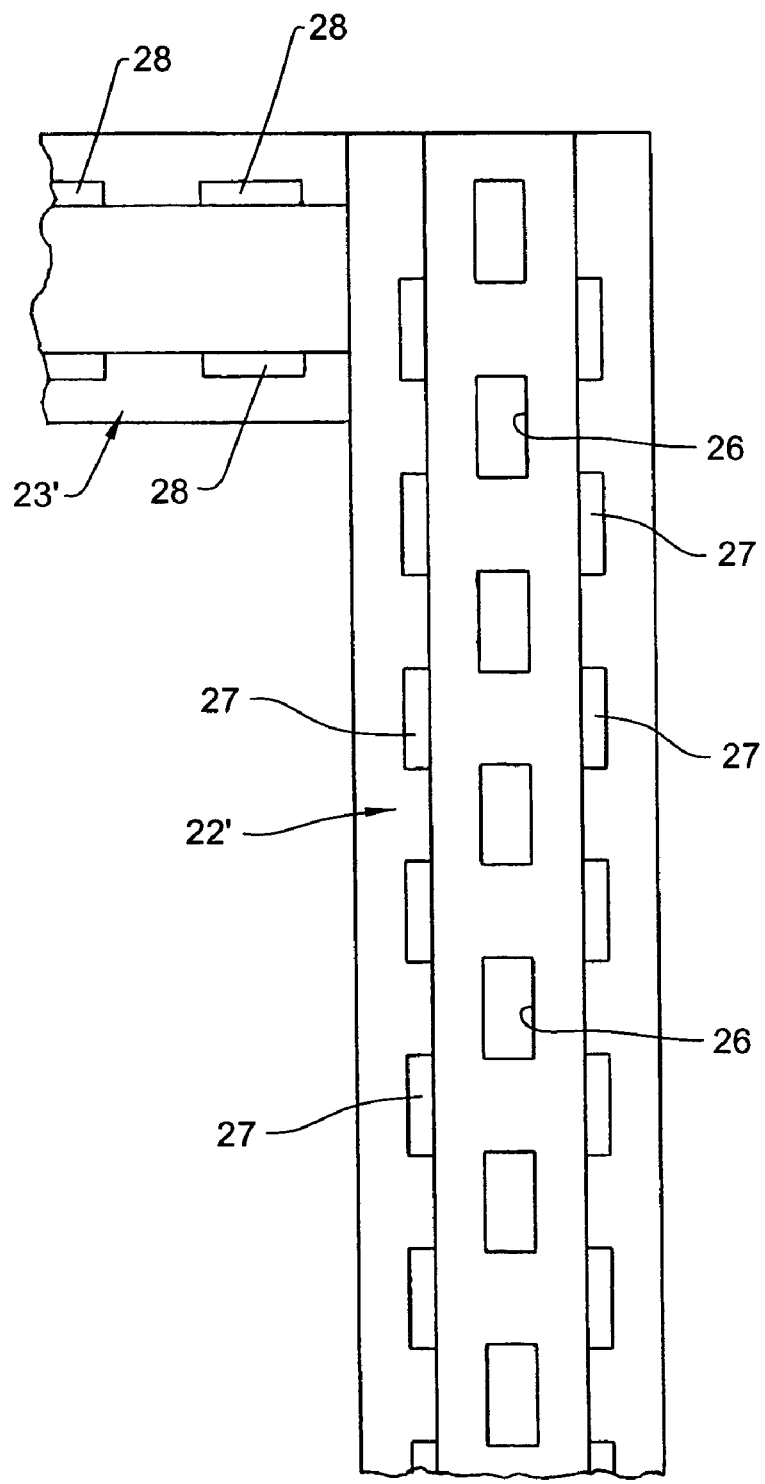
FIG. 15 is a view similar to FIG. 3 but showing a modified cross-section associated with the frame rails, the gusset arrangement being eliminated for simplicity of illustration.
Figure 16:
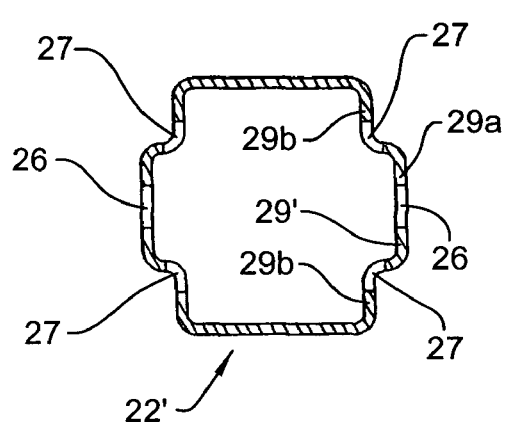
FIG. 16 is a cross-sectional view of the frame rail illustrated in FIG. 15.
Figure 17:
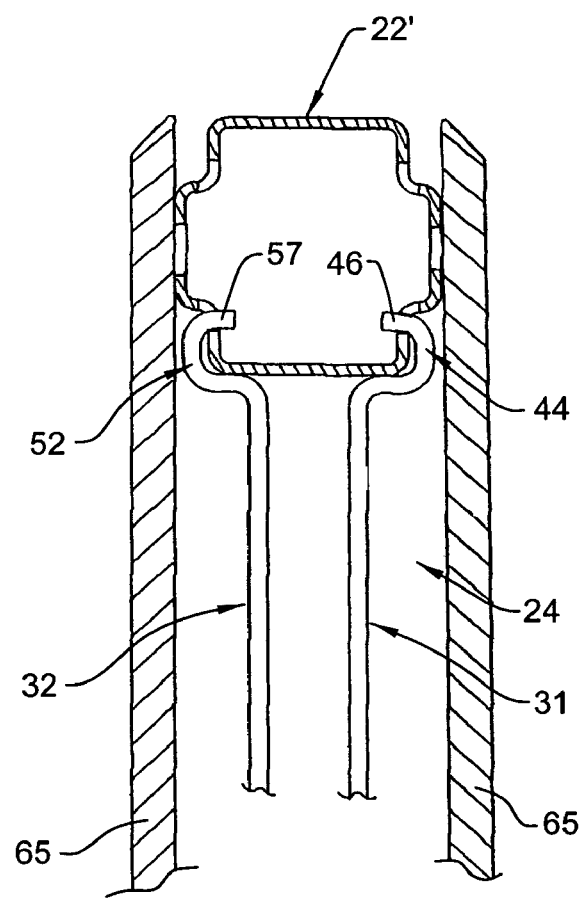
FIG. 17 is a fragmentary view which illustrates the manner in which the gusset members attach to the frame rails in the variation illustrated by FIGS. 15-16.
Figure 21:
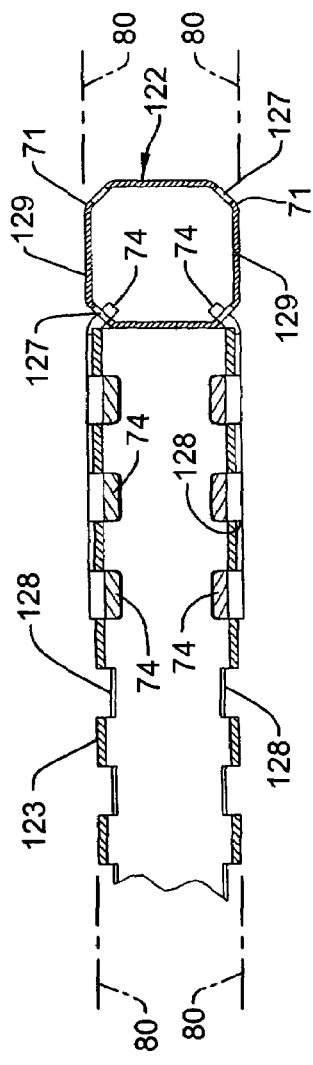
FIG. 21 is a sectional view taken generally along line 21-21 in FIG. 18.

Referencing now FIGS. 15-17, there is illustrated a variation of the frame arrangement illustrated by FIGS. 2-14. In this variation, the primary constructional difference relates to the cross-sectional configuration of the frame rails as designated 22' and 23' in these figures.

In this variation, the square cross-section of the frame rails is modified so that the opposed side faces 29' have a shallow hat-shaped profile. In particular, this profile of the side face 29' includes a center wall portion 29a which extends lengthwise of the rail member and has the slots 26 formed therein. This center wall portion 29a is sidewardly straddled by side wall portions 29b which are rearwardly offset but extend generally parallel to the center wall portion 29a. The rearward offset of the side wall portions 29b is preferably a small distance relative to the overall cross-sectional dimensions of the rail, and these side wall portions 29b each have the vertically extending row of vertically spaced slots 27 formed therethrough. The overall arrangement of the opposite side faces 29' of the rail 22, except for the depressions formed adjacent the lengthwise-extending corner edges so as to create the hat-shape profile, otherwise structurally and functionally corresponds to the rail 22 as previously described. The rail 23' identically corresponds to the rail 22' except that it is not provided with the slots 26, and the slots 28 need be provided only adjacent the ends of the rails, as discussed above.

The forming of the rails 22', 23' causes the rails to have a cross-sectional configuration which resembles a cross or "plus" sign.

With the modified rail construction of FIGS. 15-17, this enables the rail engagement structure as associated with the clamp plates 31 and 32 (FIG. 17) to again cooperate with the respective rails and engage within the slots 27, 28 in the same manner as described above relative to FIGS. 2-14. In this variation, however, as illustrated by FIG. 17, the channel-shaped rail engagement structures which effectively overlap the recessed side wall portions 29b, after assembly, are disposed within the depth of the recessed side wall so that the outermost exposed surface of the assembled arrangement is defined by the exterior surface of the center wall part 29a. This hence permits the removable cover pads, as diagrammatically illustrated at 65, to be mounted flush against the exterior face of the center wall part 29a. This permits the overall width of the finished space divider wall to be minimized without impacting the desired strength and rigidity of the wall panel.

Referring now to FIGS. 18-22, there is illustrated a further and preferred embodiment of an improved panel frame 121 according to the present invention. In this embodiment, the overall panel frame has a construction which resembles the construction associated with the frame 21 illustrated by FIGS. 2-4, and accordingly corresponding parts of the frame 121 are designated by the same reference numerals with addition of "100" thereto.

Figure 18:
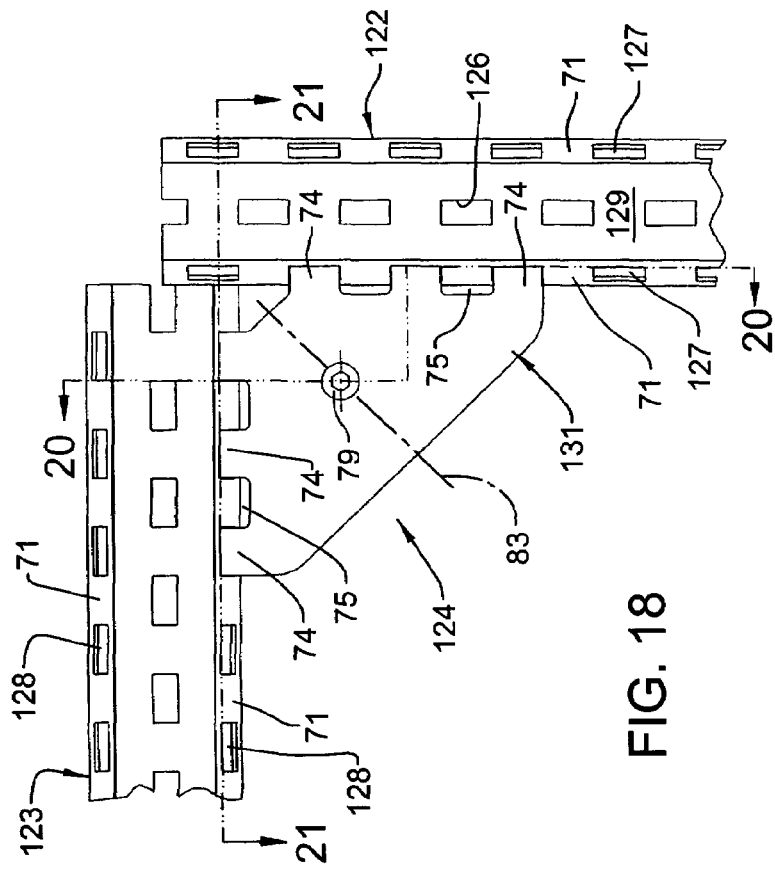
FIG. 18 is a view similar to FIG. 3 but illustrating a further embodiment of a panel frame constructed in accordance with the present invention.

More specifically, and referencing FIG. 18, which corresponds generally to FIG. 3 and represents a corner of the frame 121, the frame 121 is again defined by vertical upright rails 122 which are rigidly joined to horizontal rails 123 by gusset structures 124, the latter being defined by opposed gusset members 131 and 132 which are rigidly joined by a connecting structure 133. Each of the upright rails 122 is provided along the side faces thereof with a row of vertically elongate and vertically spaced slots 126 extending centrally thereof, which slots are for the same purpose as the slots 26 discussed above. FIG. 18 also illustrates similar slots 126 extending centrally along the side faces of the horizontal rail 123, although provision of slots 126 in this rail is not normally required. Rail 122 also has two vertically extending rows of vertically elongate and vertically spaced slots 127 associated therewith and disposed in sidewardly straddling relationship to the center slots 126, with the slots 127 being constructed generally similar to the slots 27 discussed above. Two similar rows of slots 128 are also associated with the horizontal rail 123, which slots may be provided solely adjacent the free ends of the rail, or may extend the full length of the rail if desired. In this respect, the frame 121 generally corresponds to the frame 21 as described above.

In the modified frame 121, the rails 122 and 123 are not provided with a totally square cross-section, but rather are provided with flats 71 along the lengthwise extending corners of the rails. These corner flats 71 preferably have a width which is significantly less than the width of the side face 129, such as between one-fourth to one-half the width of the side face 129. While this results in the rails 122, 123 having a cross-section which closely approximates a hollow square, nevertheless the rail cross-section is in actuality eight-sided and hence constitutes a octagon defined by two sets of four equal-sized sides, with the sides of the two sets alternating and being of different widths. The flattened corner walls 71, when viewed in cross-section, extend generally at a 450 angle relative to the planes which define the adjacent flat side walls 129.

In addition, the slots 127 are formed in and extend transversely through the flat corner walls 71, with a row of said slots 127 being formed in and extending centrally vertically along each of the flat corner walls 71 associated with the upright rail 122. The slots 128 are similarly formed in each of the flat corner walls 71 associated with the horizontal rail 123.

The gusset structure 124 is shaped to cooperate with the slots 127, 128 as associated with the flat corner walls 71 of the rails 122, 123. In this respect, the gusset 124 is provided with the gusset members 131 and 132 which are substantially identical and which clampingly cooperate with the slots 127, 128 associated with the rails 122, 123.

Figure 23:
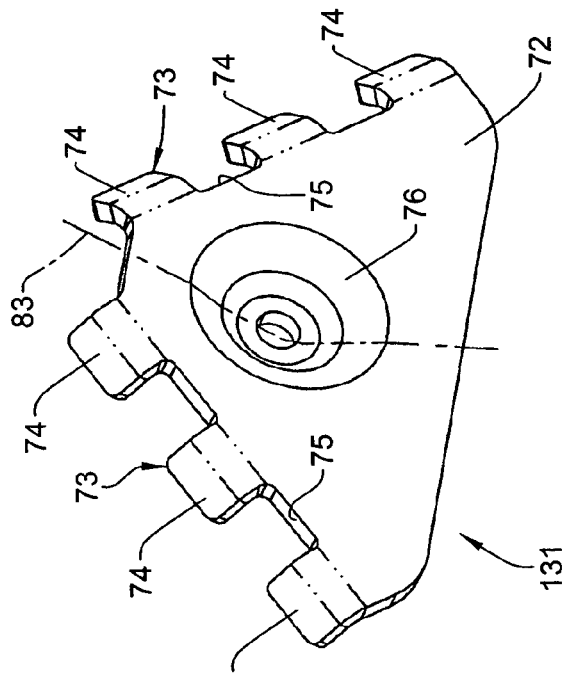
FIG. 23 is a perspective view of solely one of the gusset members shown in FIG. 22 but viewed from a different orientation.
Figure 20:
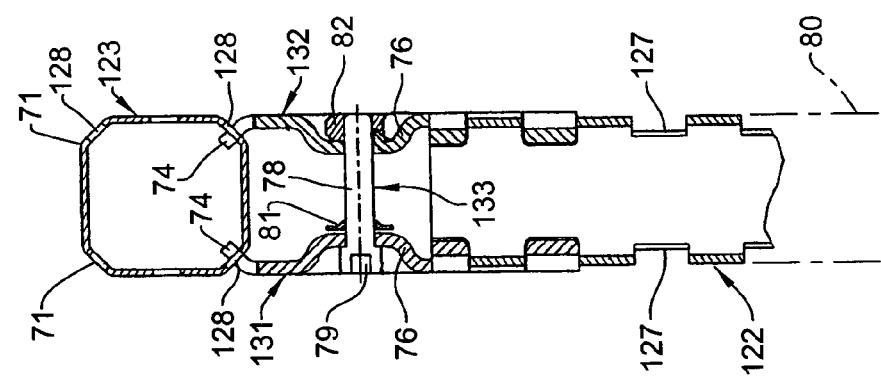
FIG. 20 is a sectional view taken generally along line 20-20 in FIG. 18.
Figure 19:
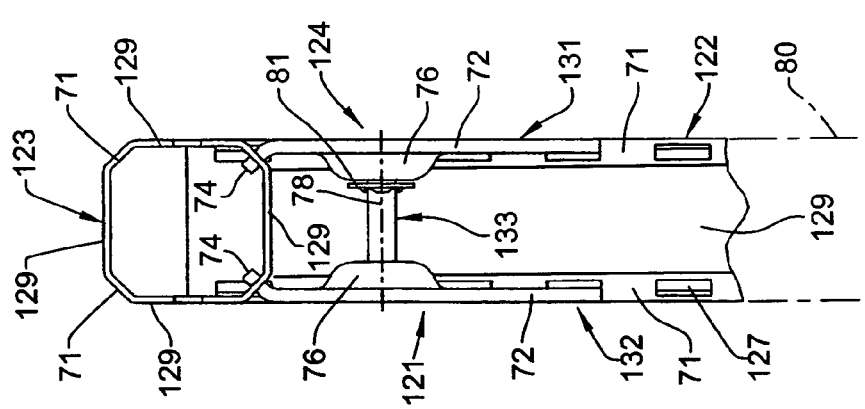
FIG. 19 is a left side elevational view of the construction illustrated in FIG. 18.
Figure 22:
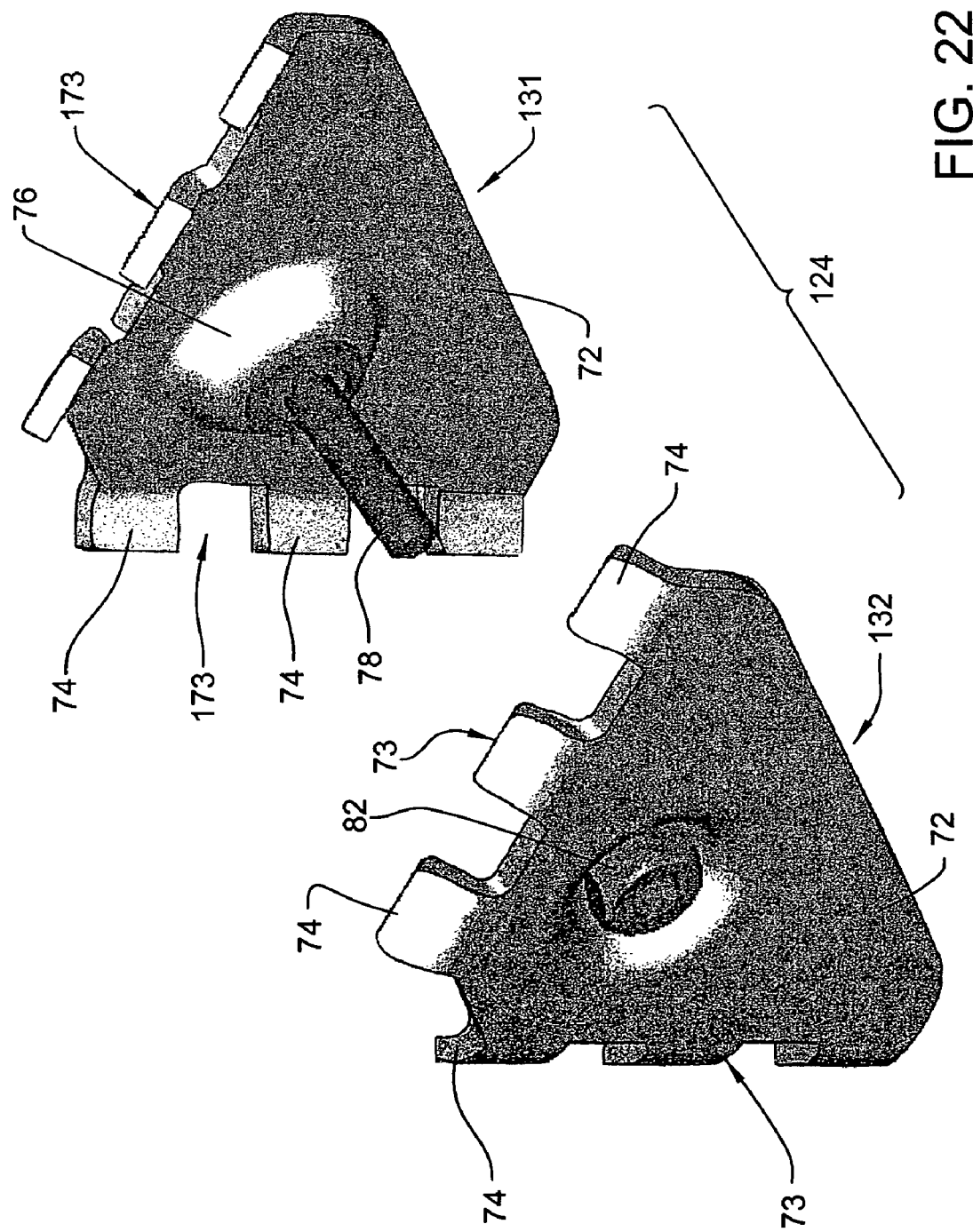
FIG. 22 is an exploded perspective view of solely the gusset structure associated with the embodiment of FIG. 18.
Figure 26:
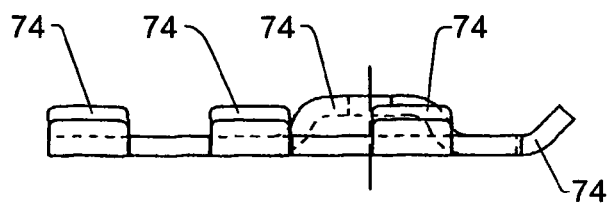
FIG. 26 is a top view of the gusset member shown in FIG. 24.
Figure 25:
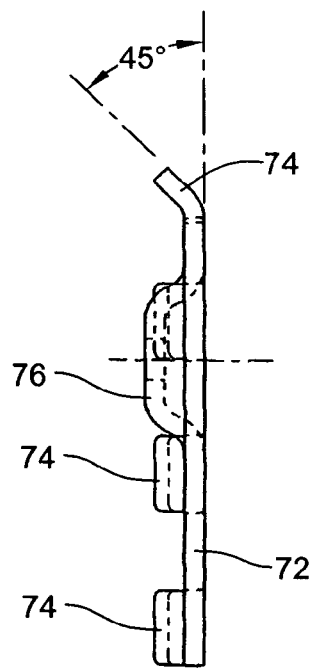
FIG. 25 is a left side elevational view of the gusset member shown in FIG. 24.
Figure 24:
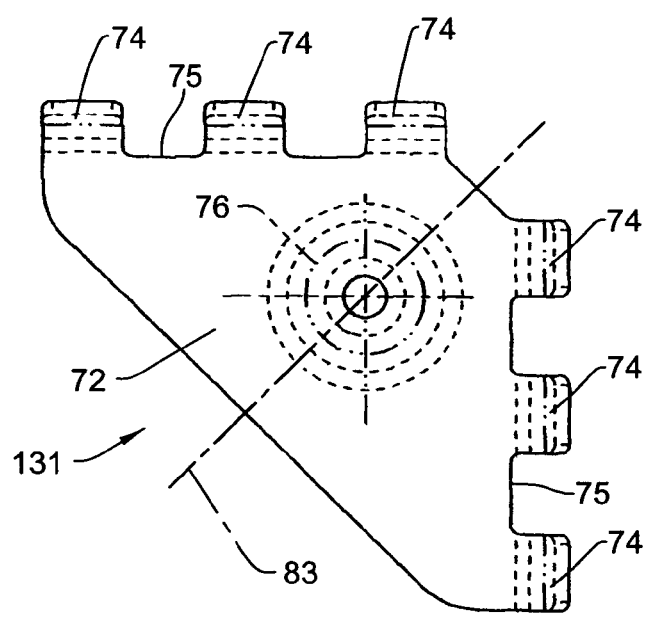
FIG. 24 is a front elevational view of the gusset member shown in FIG. 23.

As illustrated by FIG. 23, the gusset member 131 is defined by a generally triangularly-shaped base plate 72 which, along the two perpendicularly-extending edges 75 thereof, is provided with substantially identical rail engaging structures 73. Each of these rail engaging structures 73 is defined by a plurality of outwardly cantilevered tabs 74, there being three such tabs 74 associated with each edge 75 in the illustrated embodiment. The tabs 74 are sized so as to snugly cooperate with the slots 127 or 128, and in this respect the transverse centerline-to-centerline spacing between adjacent tabs 74, and the width of the individual tabs 74, corresponds generally to the size and spacing of the slots 127, 128. The width of the tabs 74, however, is preferably slightly less than the length of the slots 127, 128 to permit the tabs to fully penetrate into and through the slot while at the same time maintaining a close engagement therewith.

The tabs 74, which have a generally rectangular configuration, are cantilevered outwardly away from the edge 75 and are suitably bent so that the tabs are angled inwardly, preferably at an angle of about 45°, relative to the exterior planar surface of the base plate 72. This inwardly angled relationship enables the tabs 74 to align with the slots 127, 128 associated with the flat corner walls 71 of the rails to facilitate insertion of the tabs through the slots.

In addition, the angled relationship of the tabs 74 relative to the triangular base plate 72, and the cooperation of the slots 127, 128 as formed in the angled corner walls 71 of the rails, enables the gusset members 131 and 132, when engaged with the rails, to be disposed so that the exterior planar surfaces of the base plates 72 are substantially co-planar with (or spaced slightly inwardly from) the exterior vertical side plane 80 of the assembled frame, while at the same time the projection of the tabs 74 into and through the slots 127, 128 occurs inwardly of this exterior vertical side plane 80. This provides a compact frame structure having minimum width, and permits the cover pads (not shown) to be mounted in direct contacting engagement with the exterior side surfaces 129 of the frame rails.

The gusset member 131, centrally of the base plate 72, has a cup-shaped deformation 76 formed inwardly from the exterior surface thereof, and this deformation at the bottom wall thereof has an opening 77 extending therethrough. This opening 77 and the surrounding deformation 76 is positioned centrally on a transverse plane 83 which effectively bisects the angle defined by the perpendicular edges 75. The gusset member 131 is generally symmetrical on opposite sides of this plane 83.

The other gusset member 132 has the identical construction of the gusset member 131 as described above. In addition, however, the gusset member 132 is provided with a part of the connecting structure 133 associated therewith, namely a threaded nut 82 which is positioned within the cup-shaped depression and is preferably fixed to the gusset member, such as by welding. This threaded nut 82 cooperates with the threaded end of a threaded fastener or screw 78, the enlarged head 79 of which is accommodated within the recess defined by the cup-shaped depression 76 associated with the gusset member 131. A retainer ring 81 can be associated with the fastener 78 if desired so as to at least loosely couple the fastener to the gusset member 131.

To assemble the frame 121, the rails 122 and 123 are positioned in generally contacting transverse relationship, and the opposed gusset members 131 and 132 are disposed generally parallel to one another adjacent opposite sides of the rails and are then moved inwardly so that the tabs 74 enter into the respective slots 127 and 128. The screw 78 is threaded into the nut 82 and is tightened so as to draw the gusset members 131 and 132 toward one another. This in turn causes the angled tabs 74 to react with the edges of the slots 127, 128 due to the angled orientation of the tabs 74, whereupon the tabs 74 effectively draw or wedge the rails 122, 123 toward the gusset members, and effect drawing of the rail 122 into snug engagement with the end 130 of the rail 123. This thus creates a strong and rigid connection between the two rails, without causing twisting of the rails, and results in a frame construction of minimal transverse width.

It will be understood that, while the gusset members 131 and 132 differ solely due to the provision of a threaded structure associated with the gusset member 132, which threaded structure is provided either by a fixed nut as illustrated or by forming and threading a boss in the main base plate, nevertheless the cooperating pair of gusset members 131 and 132 can be applied to the rails from either side thereof so as to provide improved convenience of access and assembly.

Figure 27:
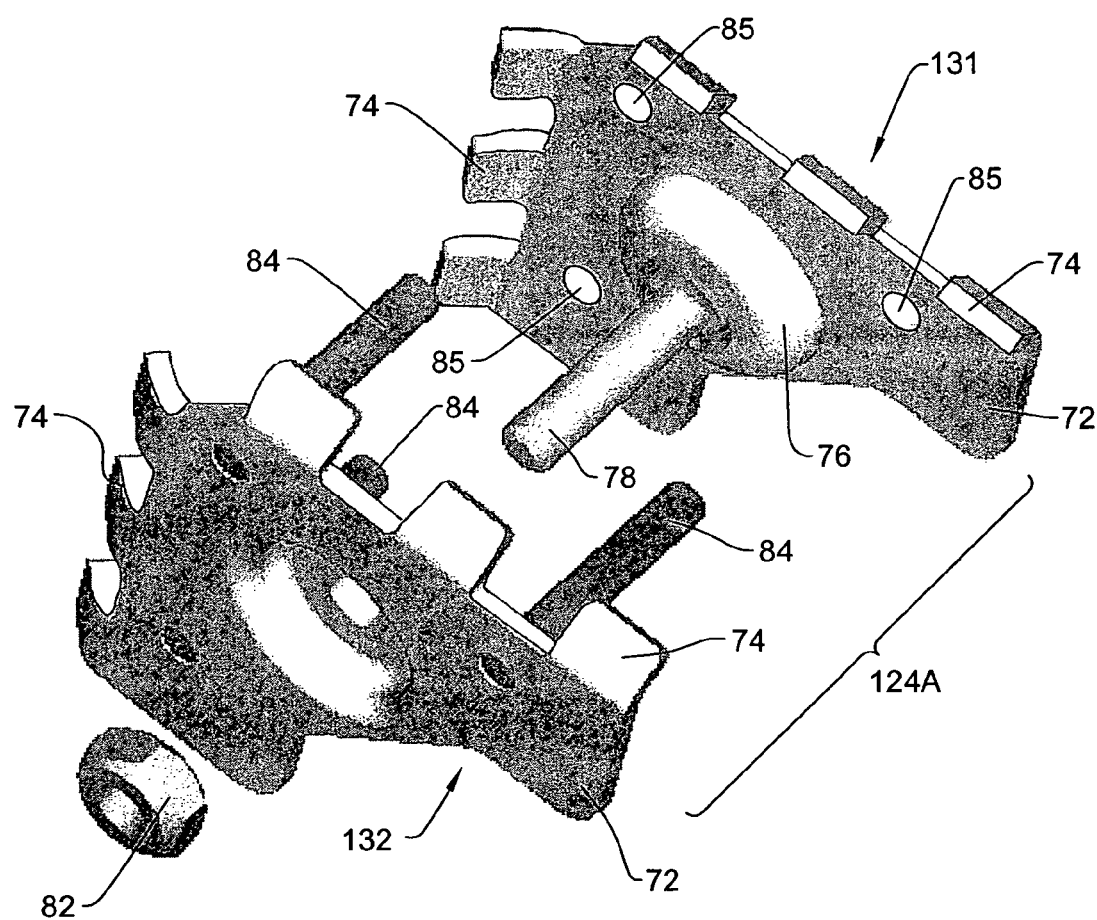
FIG. 27 is an exploded view of a first variation of the gusset structure illustrated by FIG. 22.

Referring now to FIG. 27, there is illustrated a gusset structure 124A which generally corresponds to the gusset structure 124 but incorporates a variation thereof. More specifically, the gusset structure 124A incorporates substantially all of the structure of the gusset 124 and hence cooperates with the rails 122, 123 to form the frame in the same manner described above. The gusset structure 124A, however, additionally incorporates alignment structure to facilitate the transverse coupling of the gusset members 131 and 132 together. In this regard, the gusset member 132 has a plurality, here three, of alignment pins 84 fixed thereto and cantilevered perpendicularly inwardly from the base plate 72. The opposed gusset member 131 has a similarly positioned plurality, here three, of alignment openings 85 formed transversely through the base plate 72. The pins 84 are adapted to align with and slidably project through the openings 85 when the gusset members 131 and 132 are moved toward one another and are brought into fixed fastened relationship with one another due to engagement of the screw 78 with the threaded nut 82. Due to provision of the alignment structure and specifically the engagement of the alignment pins 84 within the openings 85, this ensures that the opposed gusset plates are properly aligned with one another, and hence the nut 82 can be a totally detached piece, rather than being permanently fixed to the gusset member.

Figure 28:
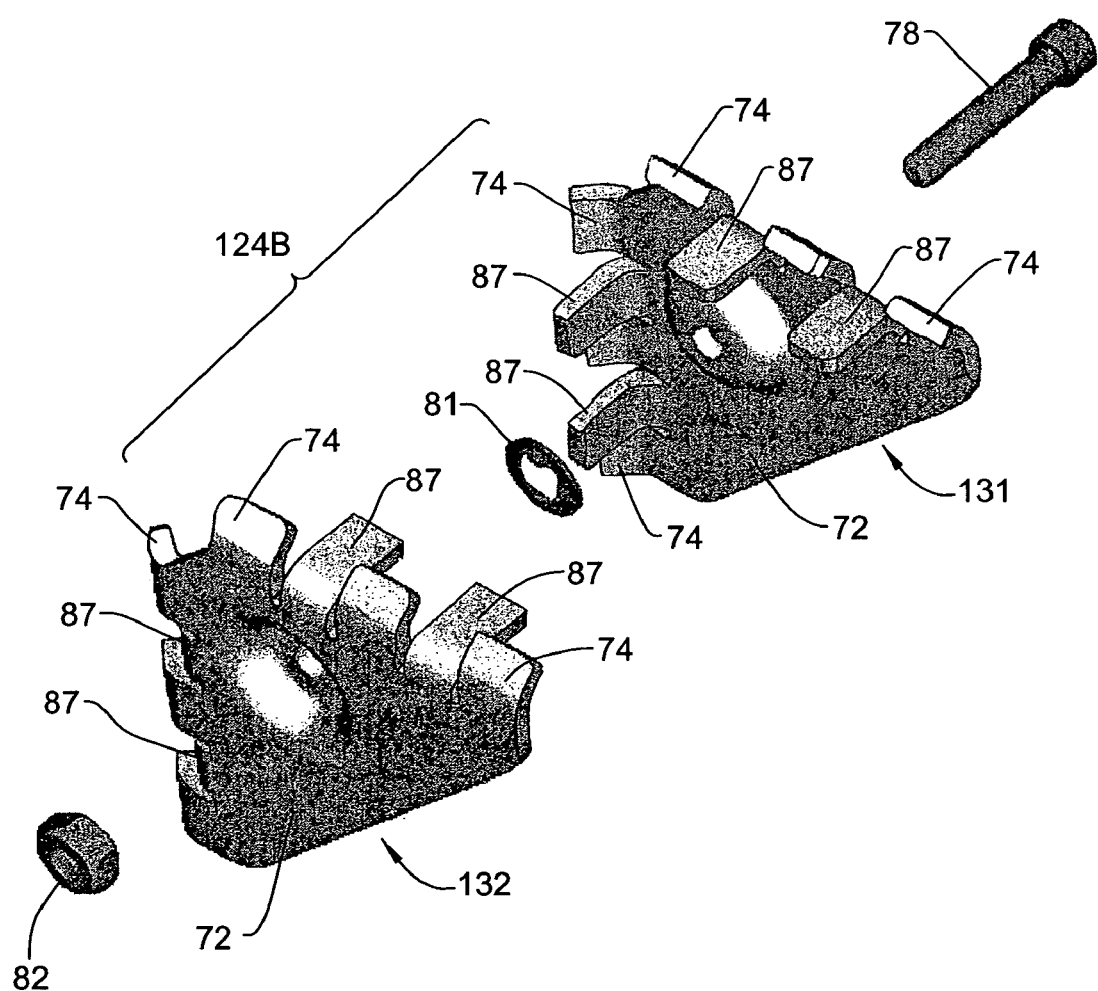
FIG. 28 is an exploded view of a second variation of the gusset structure illustrated by FIG. 22.

A further variation of the gusset structure 124 is shown in FIG. 28 wherein there is illustrated a gusset structure 124B which is structurally and functionally substantially identical to the gusset structure 124 described above, but the modified gusset structure 124B additionally has a plurality (here two) of base fingers or tabs 87 associated with the plurality of tabs 74 which define each rail engaging structure. The tabs 87, like the tabs 74, are preferably formed integrally and monolithically with the base plate 72 and are bent inwardly from the respective edge 75. The tabs 87 are bent so as to be cantilevered inwardly in the same general direction as the bending of the clamping tabs 74, except that the tabs 87 are bent inwardly at an angle of about 90° to hence project perpendicularly with respect to the base plate 72. The tabs 87 are formed and bent inwardly at locations corresponding to the spacing or intervals between the sidewardly adjacent tabs 74.

Figure 29:
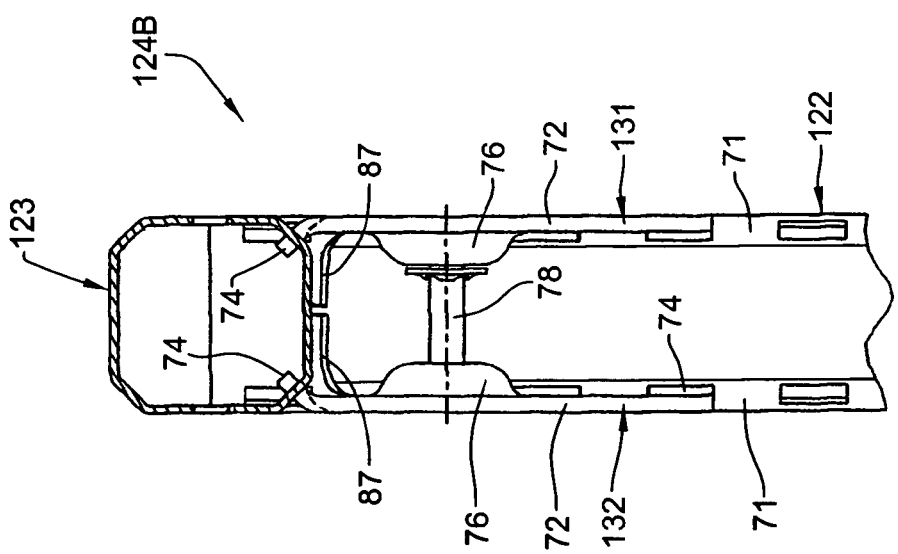
FIG. 29 is a view which corresponds generally to FIG. 19 but which illustrates the cooperation of the gusset structure of FIG. 28 with the transversely joined frame rails.

By providing the opposed gusset members 131 and 132 with the base tabs 87, which tabs protrude inwardly toward one another when the gusset structure 124B is assembled as illustrated in FIG. 29, the base tabs 87 effectively define a substantially planar support surface which, as the opposed gusset members 131 and 132 are moved inwardly toward one another due to tightening of the threaded fastener 78, effectively define a support surface which, due to the camming or wedging of the angled tabs 74 against the slot walls defined in the rail edge walls 71, causes the opposed exterior surface of the respective rail, such as the rail 123 in FIG. 29, to be clampingly engaged against the outer surfaces of the base tabs 87 to provide increased strength and rigidity to the connected rails and to the overall frame.

Figure 30:
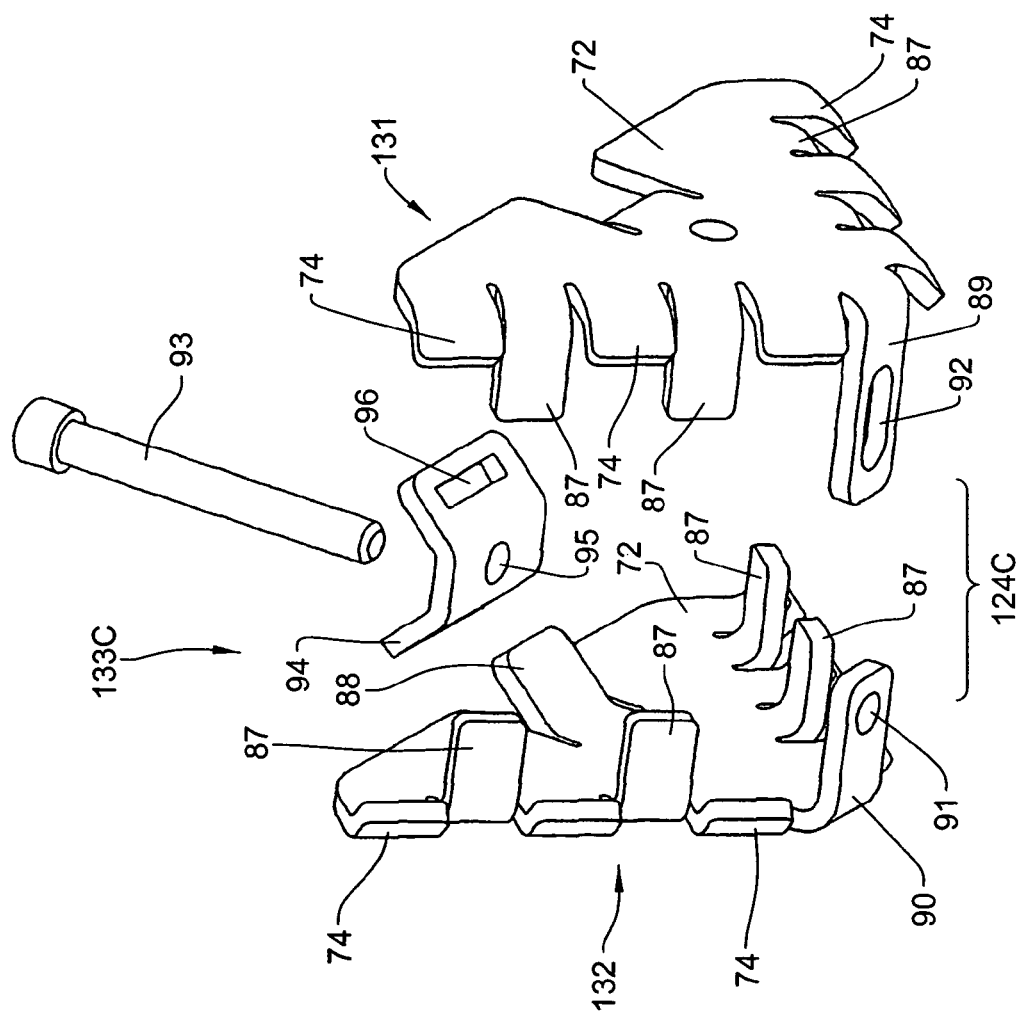
FIG. 30 is an exploded perspective view of a variation of the gusset structure illustrated in FIGS. 28-29.
Figure 31:
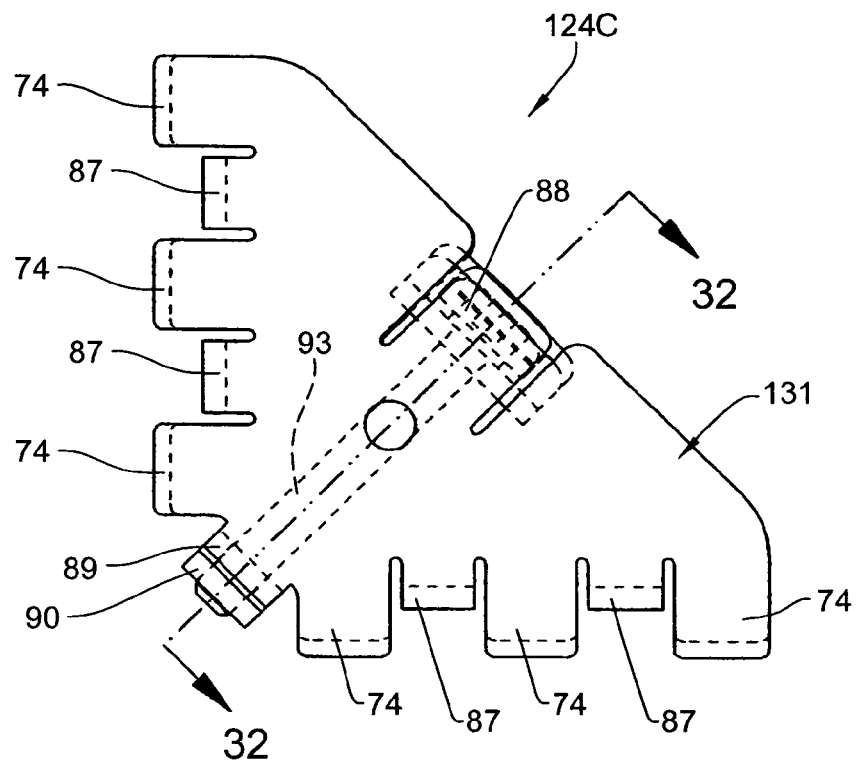
FIG. 31 is a side elevational view of the gusset structure of FIG. 30 shown in an assembled condition.
Figure 32:
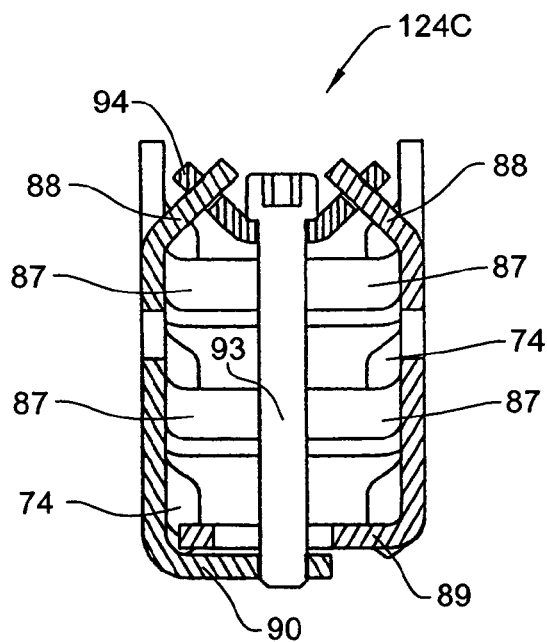
FIG. 32 is a sectional view taken generally along line 32-32 in FIG. 31.
Figure 33:
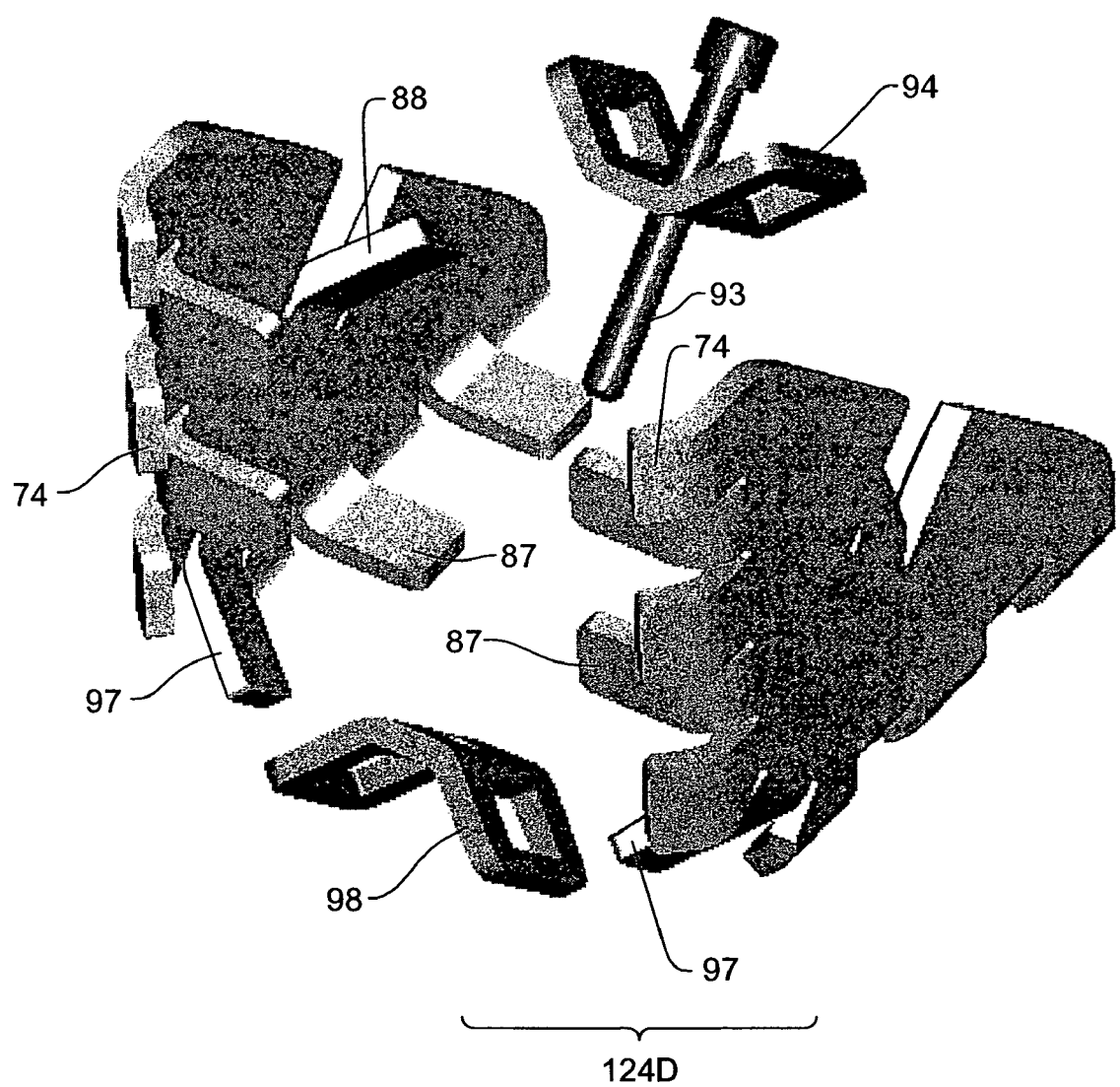
FIG. 33 is an exploded assembly view which illustrates a variation of the gusset structure shown in FIGS. 30-32.
Figure 34:
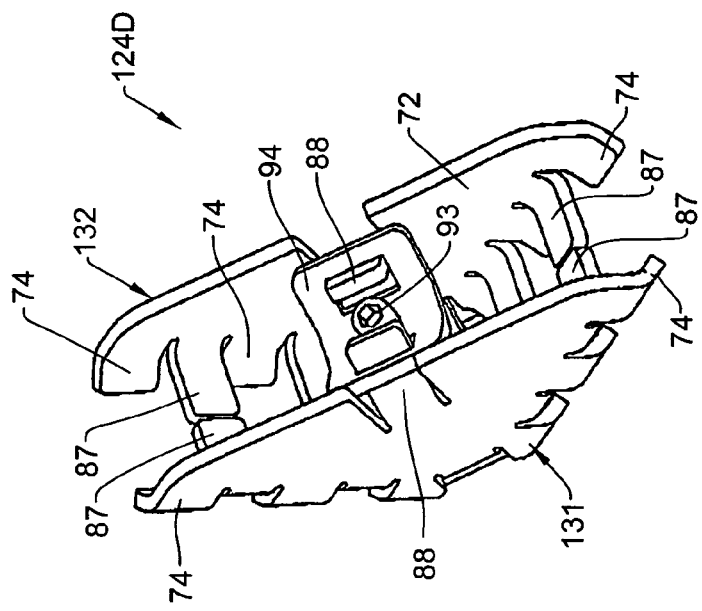
FIG. 34 is a perspective view showing the gusset structure of FIG. 33 in an assembled condition.
Figure 35:
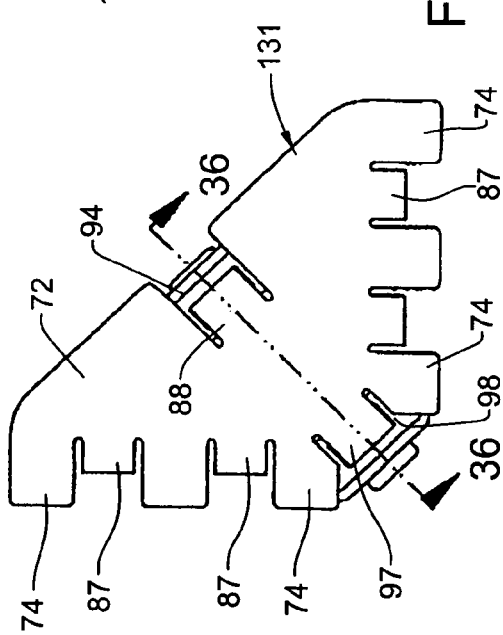
FIG. 35 is a side elevational view of the assembled gusset structure shown in FIG. 34.

Referring now to FIGS. 30-32, there is illustrated a still further variation of a gusset structure 124C. This gusset structure 124C again incorporates opposed cooperating clamping members 131, 132 which are defined by generally triangular base plates 72 and which, on the perpendicularly extending edges thereof, are again provided with clamping tabs 74 and base tabs 87 which structurally and functionally substantially identically correspond to the corresponding structure associated with the gusset structures 124 and 124B described above. The modified gusset structure 124C, however, has a modified connecting structure 133C which, instead of extending transversely between the opposed gusset members, is instead positioned within the space between the gusset members and has its threaded screw oriented within the plane of the frame, rather than transverse thereto, to permit access to the screw from either side of the frame during assembly or disassembly thereof.

For this purpose, the connecting structure 133C includes a first cantilevered flange 88 which is provided on each of the gusset members 131 and 132. The flange 88 is bent inwardly from the base plate 72 adjacent the free edge of the base plate, namely the edge which is free of the tabs 74 and 87. This flange or wing 88 is angled inwardly in the same direction as the tabs 74, and preferably is bent so as to be cantilevered inwardly at an angle of about 45° relative to the respective base plates 72.

When the gusset members 131 and 132 are disposed in opposed relationship to one another, generally as illustrated by FIG. 32, the angled flanges or wings 88 are disposed in generally opposed but angled relationship, and cooperate with a generally V-shaped coupling or connecting plate 94, the latter having slots 96 extending through the legs thereof and which permit slidable passage of the wings 88 therethrough. This coupling member 94 also has an opening 95 extending through the center portion thereof for permitting passage of the threaded fastener or screw 93.

To permit anchoring of the screw 93, the gusset member 131 has a first flange 89 cantilevered inwardly in substantially right angled relationship to the base plate 72, which flange 89 is located generally at the apex between the perpendicular sides or edges 75 of the gusset member. A second flange 90 is similarly cantilevered perpendicularly inwardly from the apex of the other gusset member 132. The flanges 89 and 90 are positioned in offset (i.e. non-aligned) relationship so as to physically overlap one above the other when the gusset plates are assembled substantially as illustrated in FIG. 32. The lower flange 90 has a threaded opening 91 therethrough, the latter overlapping with an enlarged opening or slot 92 formed in the other flange 89.

To assemble the gusset structure 124C, the V-shaped connector plate 94 is slidably engaged over the protruding wings 88 of the opposed gusset plates 131 and 132, and the threaded fastener 93 is inserted through the opening 95 in the V-shaped connecting plate 94 and is then threadably engaged into the threaded opening 91. By suitable rotation of the threaded fastener 93, the V-shaped connector plate 94 is urged downwardly toward the overlapping flanges 89-90, whereupon the wedge-like cooperation created by engagement of the wings 88 within the slots 96 of the V-shaped connector plate 94 draws the gusset members 131-132 toward one another, whereupon the tabs 74 create the desired wedging engagement with the respective rails 122, 123 in the same manner as described above.

With the gusset structure of FIGS. 30-32, the threaded fastener 93 is not oriented toward either side of the frame, but rather is oriented generally within the plane of the frame, and hence the fastener is readily accessible for engagement with a tool by means of a workman located adjacent either side of the frame.

Figure 36:
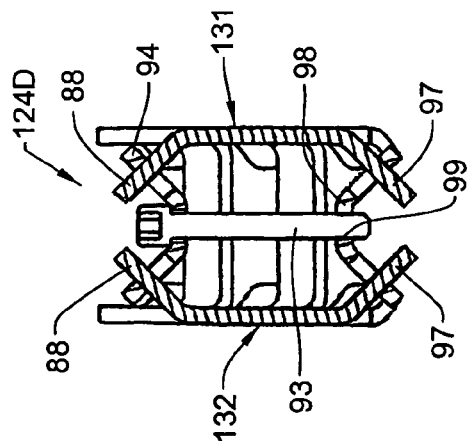
FIG. 36 is a sectional view taken generally along line 36-36 in FIG. 35.
Figure 39:
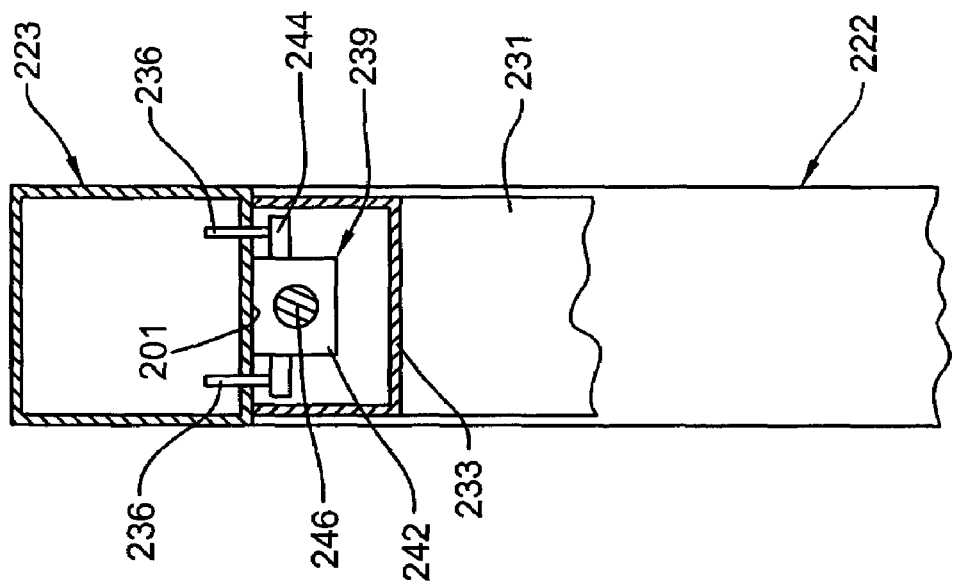
FIG. 39 is a view similar to FIG. 2 but illustrating another embodiment of a panel frame according to the present invention.
Figure 40:
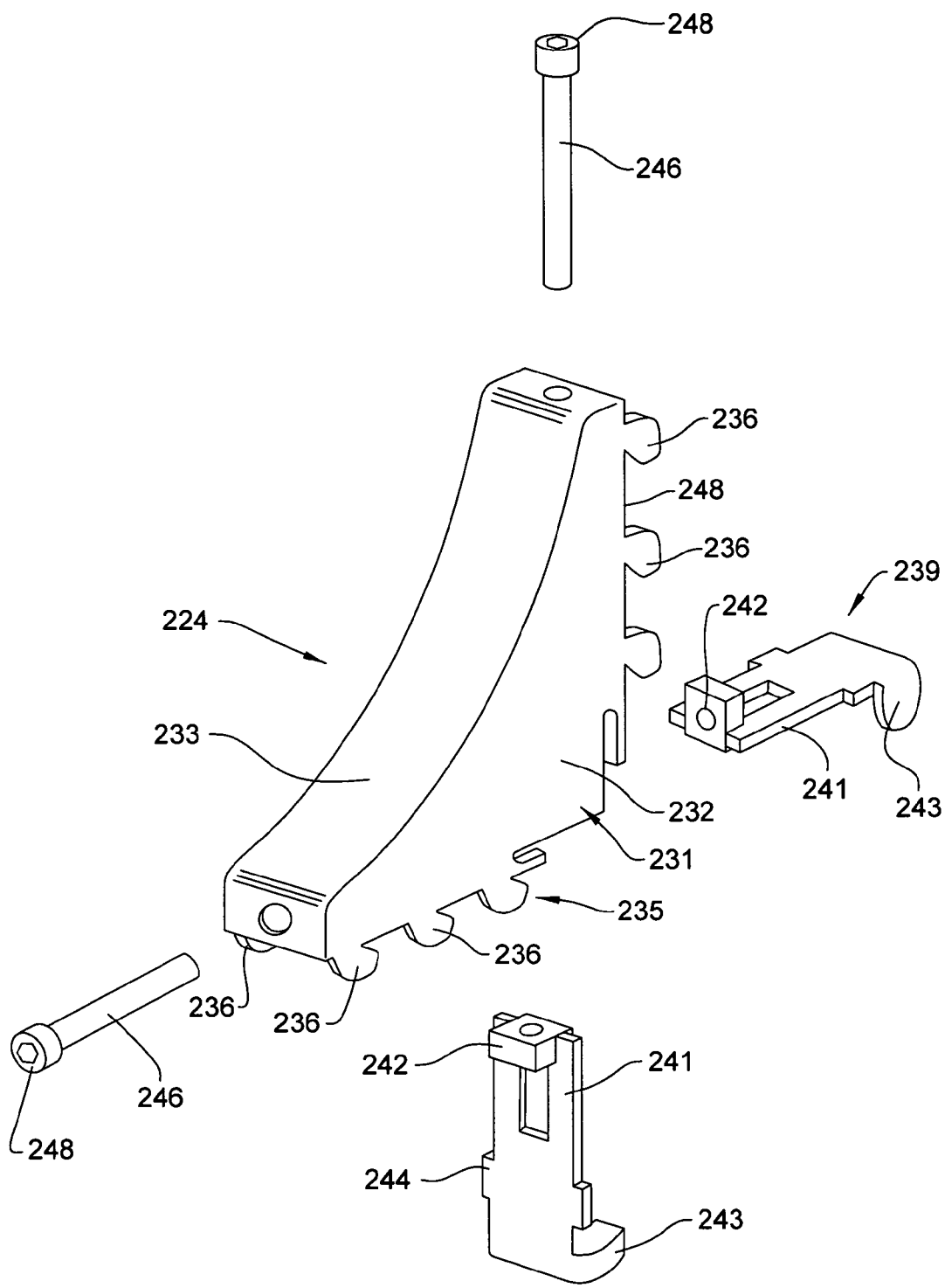
FIG. 40 is a perspective view of the gusset structure associated with the panel frame of FIG. 39.

Considering now FIGS. 33-36, there is illustrated a gusset structure 124D which constitutes a variation of the gusset structure 124C illustrated in FIGS. 30-32. The gusset structure 124D incorporates therein all of the same features possessed by the gusset structure 124C except that the inwardly protruding securing flanges 89-90 are eliminated, and in place thereof the gusset structure 124D has each of the gusset members 131, 132 provided with a further flange or wing 97 bent inwardly therefrom generally at the apex of the base plate 72. The flange or wing 97 is bent inwardly in angled relationship to the base plate, such as at an angle of about 45°, and is generally aligned with the other wing or flange 88 except that it is reversely angled relative to the flange 88. The wings 97 are disposed in opposed relationship when the gusset members 131 and 132 are positioned in sidewardly opposed relationship substantially as illustrated in FIG. 36, and these wings 97 cooperate with a further V-shaped connecting member 98 which cooperates with the wings 97 in the same manner as the upper V-shaped connecting member 94 cooperates with the wings 88. The V-shaped connecting plate 98, however, has the opening 99 extending therethrough provided with an internal thread for engagement with the threaded fastener 93. Hence, when the fastener 93 is rotated, it cooperates with the V-shaped connecting plates 94 and 97 tending to urge these connecting plates toward one another. These V-shaped connecting plates in turn cooperate with the opposed wedges defined by the flanges or wings 88 and 97 to wedge the opposed gusset members 131 and 132 inwardly toward one another, thereby causing the wedge tabs 74 to wedgingly engage the perpendicularly connected frame rails in the same manner as described above.

Referring now to FIGS. 37-40, there is illustrated a still further embodiment of an improved panel frame 221 in accordance with the present invention. This embodiment, like the other embodiments described above, again utilizes a detachable gusset structure for rigidly connecting a transversely (i.e. perpendicularly) intersecting pair of frame rails.

More specifically, this embodiment of the frame 221 again involves a frame which is of a generally rectangular ring-shaped upright configuration similar to that illustrated in FIG. 2 and specifically includes a pair of parallel uprights rigidly joined through gussets to a vertically spaced pair of horizontal crossbeams. In FIG. 37 only one upright rail 222 and one horizontal rail 223 are shown for simplicity and convenience in illustration, and these rails are rigidly joined in transverse intersecting relation by a removable gusset structure 224.

The frame rails 222 and 223 are again defined by elongate hollow tubular elements of rectangular, preferably square, cross-section, and the opposed side faces 229 of at least the upright rail 222 is again typically provided with a vertically extending row of slots 226 extending centrally therealong. Each of the other two side or edge surfaces 201 of each rail 222 and 223 is also provided with two vertically extending rows of vertically spaced, elongate slots 227 formed therein and extending vertically therealong, the two rows being sidewardly spaced so as to be disposed adjacent opposite sides of the respective side face 201. More specifically, with respect to the rail 222, the slots 227 are formed in the exposed end faces 201 which transversely join the side faces 229. With respect to the horizontal rail 223, these slots 227 are again formed in the edge faces 201 which, due to the horizontal orientation of the rail 223, face upwardly and downwardly.

Considering now the construction of the gusset structure 224, same includes a one-piece gusset member 231 which is of a generally open channel-shaped cross-section, as defined by a pair of generally parallel side plates 232 which are rigidly joined by an arcuate bridging plate 233 which positions the side plates 232 in a sidewardly spaced relationship which closely approximates but is slightly less than the width of the rail faces 201.

Each of the side plates 232 has a pair of edges 234 which substantially perpendicularly intersect, and each of these edges 234 has a rail engaging structure 235 associated therewith. This latter structure is defined by a plurality, here three, of generally L-shaped tabs or hooks 236 which are co-planar with the respective side plate 232 and are cantilevered outwardly away from the respective edge 234. All of the hooks 235 as associated with each respective edge 234 are oriented so as to point generally toward the corner or apex of the respective side plate. The hooks 236 are sized to permit them to freely pass transversely through the respective slots 227, with the hooks 236 then overlapping and engaging the web walls between adjacent slots as a result of relative movement between the rail and the gusset member, such as relative movement of the upper rail 223 leftwardly in FIG. 37 relative to the hooks 236.

The gusset structure 224 also mounts thereon a pair of securing arrangements 239, one such arrangement being disposed generally between each sidewardly adjacent pair of parallel edges 234, whereby one securing arrangement 239 cooperates with the top rail 223, and the other securing arrangement 239 cooperates with the vertical rail 222.

Each securing arrangement 239 includes an elongate slide member 241 which is disposed adjacent and extends generally parallel to the adjacent side edges 234, and this slide member 241 has an internally threaded block or nut 242 fixed adjacent an outer end thereof. The other end of the slide member 241 has a sidewardly spaced pair of tabs or fingers 243 fixed thereto, which tabs are cantilevered transversely from the slide member 241 in the same direction as the hooks 236 so as to protrude outwardly beyond the adjacent edges 234. The pair of protruding tabs 243 are sidewardly spaced by a distance corresponding to the sideward spacing between the slots 227 of adjacent rows, and are sized so as to readily pass into a sidewardly adjacent pair of slots 227 while occupying substantially the entire length of the slots.

The slide member 241 has a guide plate 244 fixed thereto and extending transversely thereacross. The guide plate 244 has outwardly protruding ends which are slidably guided within elongate guide slots 245 which are formed in the side plates 232 in close proximity and parallel relationship to the edges 234. This guide plate 244 and its engagement within the guide slots 245 provides support for the forward end of the slide 241 while enabling the slide to be linearly displaced in a direction generally parallel to the adjacent edges 234. The slide 241 at its other end has the threaded nut 242 disposed in threaded engagement with an elongate activator screw 246, the latter being disposed with its axis generally parallel with the adjacent edges 234. The activator screw 246 protrudes outwardly and is rotatably supported within an opening 247 formed in the bridge wall 233, whereby the enlarged head 248 of the activator screw 246 is disposed adjacent but exteriorly of the bridge wall.

Each of the securing arrangements 239 has the same structural and operational characteristics and, due to its disposition adjacent a respective pair of parallel edges 234, one arrangement 239 cooperates with the slots 227 associated with the horizontal rail 223, and the other arrangement 239 similarly cooperates with the slots 227 formed in the upright or vertical frame rail 222.

To assemble the frame 221 in the manner illustrated by FIG. 37, the gusset arrangement 224 is initially mounted on and fixedly secured to the horizontal rail 223. This is accomplished by initially rotating the screw 246 so that the tabs 243 are spaced outwardly adjacent the apex of the side plates. The gusset member 231 is then moved transversely toward the face 201 of the rail 223 so that the tabs 243 pass through a sidewardly adjacent pair of slots 227 positioned adjacent the end of the rail 223. During this transverse movement of the gusset member 231 into engagement with the rail 223, the hooks 236 as associated with the parallel edges 234 similarly transversely pass through others of the slots 227. With the edges substantially in contact engagement with the rail surface 201, screw 246 is then rotated which, due to its engagement with the nut 242 and the confinement of the tabs 243 within the slots 227, causes the head 248 to react against the bridge wall so as to push the gusset member 231 lengthwise (rightwardly in FIG. 37) relative to the rail 223 to hence cause the hooks 236 to move into overlapping and hence locking engagement with the adjacent web walls which separate the adjacent slots 227.

Once the gusset member 231 has been fixedly and rigidly secured to the rail 223, it is thereafter moved into engagement with the other rail 222. This is accomplished by positioning the tabs 243 adjacent the apex, and then moving the rail 222 transversely inwardly relative to the gusset member so that the tabs 243 and the hooks 236 pass through appropriate slots 227 formed in the rail 222. The activating screw 246 is then rotated and, due to the fixed securement of the gusset member 231 to the other rail 223, the tab 243 engaged with the rail 222 reacts against the rail and urges it to move relative to the gusset member (downwardly in FIG. 37) so as to cause the hooks 236 to create a fixed engagement with the edge wall of the rail 222.

With the gusset arrangement 224 illustrated by FIGS. 37-40, while the gusset arrangement does require a greater number of components due to provision of separate and independently actuated securing arrangements 239, it nevertheless does have desirable characteristics in that it requires only a single gusset member 231, and the use of separate activating arrangements 239 enables the gusset member to be initially fixedly secured to one of the rails, prior to its thereafter being fixedly secured to the other rail. In addition, the activating screws are all positioned for activation generally within the plane of the frame, rather than transverse thereto, so that access to the screws is equally convenient from either side of the frame.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. In an upright space-dividing wall panel having an upright rigid frame, said frame having a rectangular ring-shaped configuration defined by a pair of sidewardly spaced and generally parallel elongated upright rails, and generally parallel and vertically spaced top and bottom elongate rails extending generally horizontally between said upright rails wherein said upright rails and said top and bottom rails are joined together by corner connections, and a detachable gusset structure at each said corner connection rigidly joining one end of each said top and bottom rail to a respective one of said upright rails to define a respective one of said corner connections, comprising the improvement wherein:

said gusset structure comprising a pair of first and second gusset members positioned in sidewardly adjacent relationship at a corner region between transversely intersecting first and second said rails for rigidly clamping said first and second rails together to define a respective one of said corner connections;

said first and second rails each having a plurality of first and second slots formed therein and respectively disposed within first and second sidewardly-spaced rows which extend in a lengthwise direction of the respective rail;

each said gusset member having first and second rail engaging structures disposed adjacent marginal edge portions thereof which extend in right angled relationship to one another;

each said rail engaging structure including a plurality of outwardly-protruding cantilevered fingers disposed in sidewardly spaced relation and oriented for insertion into the slots associated with one of the rows on one of said first and second rails wherein said first and second rail engaging structures permit installation of each said gusset structure at any of said corner connections;

said first gusset member being positioned at said respective corner connection adjacent one side of said first and second rails so that the fingers on the respective first and second rail engaging structures are engaged within the slots associated solely with the first row of the respective first and second rails;

said second gusset member being positioned at said respective corner connection adjacent the other side of said first and second rails so that the fingers on the respective first and second rail engaging structures are engaged within the slots associated with solely the second row of the respective first and second rails; and said gusset structure including a manually-activated fastening structure co-acting between said pair of sidewardly adjacent gusset members for drawing the gusset members toward one another to cause the fingers on said first and second gusset members to clampingly engage the first and second rails therebetween.

2. A wall panel according to claim 1, wherein the first and second rows of slots as formed in each of said first and second rails are disposed adjacent opposite sides of the frame, and wherein the gusset member includes a main platelike body which is vertically oriented when positioned within the corner between the intersecting first and second rails and has the respective first and second rail engaging structures fixedly associated with and extending lengthwise along the perpendicularly extending marginal edge portions thereof, and the plurality of cantilevered fingers associated with each of said rail engaging structures being angled sidewardly relative to the vertical orientation of the main body so that the fingers have at least a partial sideward orientation as they project through the respective slots associated with the respective rail.

3. A wall panel according to claim 2, wherein the cantilevered fingers associated with said first gusset member of said pair are formed as generally L-shaped hooks, and wherein the cantilevered fingers associated with the second gusset member of said pair are formed as generally straight tabs.

4. A wall panel according to claim 3, wherein the straight tabs as associated with said second gusset member have a taper associated with at least one side edge thereof for effecting a wedging engagement with the respective rail when inserted into the respective slot.

5. A wall panel according to claim 4, wherein the cantilevered fingers associated with each of said gusset members protrude sidewardly in generally perpendicular relationship relative to the main plate-like body.

6. A wall panel according to claim 5, wherein the first and second rails are defined by hollow metal tubes having a generally square cross-section, each said tube having first and second exterior side walls which define opposite sides of the tube and respectively define opposite exterior side surfaces of the frame, said first and second rows of slots being formed in the first and second exterior side walls respectively.

7. A wall panel according to claim 6, wherein each said rail engaging structure comprises a channel which is elongated generally along a respective marginal edge of the main body and opens sidewardly relative thereto, said channel having an outer wall which defines said plurality of sidewardly spaced cantilevered fingers, said channel having a base wall which is positioned to overlap a respective exterior wall of the tube when the fingers are positioned to penetrate through the respective slots.

8. A wall panel according to claim 1, wherein each said gusset member includes a main body defined by a generally vertically-oriented platelike member which is positioned within the corner between said first and second rails, said first and second rail engaging structures being integrally and monolithically joined to and extending along perpendicularly extending edge portions of said main platelike member, said fingers all being oriented in angled relationship in the same sideward direction relative to a vertical orientation of the main platelike member.

9. A wall panel according to claim 8, wherein all of the fingers are oriented so as to be angled sidewardly at an angle of about 45° relative to the vertical orientation of the main platelike member so that the fingers of the opposed gusset members, when engaged with the respective rail, effect opposed clamping of the rail therebetween and wedging of the respective rail toward the gusset members.

10. A wall panel according to claim 9, wherein the rails comprise metal tubes having a cross-section which approximates a square, and wherein the slots defining the first and second rows are formed in said tube in close proximity to adjacent corners of the square, and wherein said rail engaging structures when engaged with the slots do not protrude outwardly beyond the exterior surface of the frame.

11. A wall panel according to claim 10, wherein the tube has the lengthwise extending corners thereof flattened to define narrow flat corner surfaces which angle between larger flat side surfaces of the tube, said slots being formed through said narrow angled corner surfaces.

12. A wall panel according to claim 10, wherein each of the rail engaging structures has at least one base flange which is inwardly cantilevered from the respective marginal edge portion in generally perpendicular relationship to the vertical orientation of the main platelike member, said base flange being positioned adjacent the respective cantilevered fingers for being disposed in supportive engagement with an opposed exterior surface of the rail due to the latter being wedged downwardly toward the base flange by the clamping fingers.

13. A wall panel according to claim 12, wherein the fastening structure includes a manually rotatable screw which cooperates between and has a threaded engagement with a threaded part associated with one of said gusset members for drawing the sidewardly adjacent gusset members toward one another in response to rotation of the screw.

14. A wall panel according to claim 13, wherein the screw is positioned generally between the main platelike members associated with the first and second gusset members and is oriented so that the rotational axis of the screw extends generally within an upright plane as defined between vertical planar boundaries of the frame, said screw having an enlarged tool-engaging head which is readily accessible from either side of the frame for engagement with a suitable tool.

15. A wall panel according to claim 14, wherein the sidewardly adjacent gusset members define thereon an opposed pair of cantilevered inclined flanges which angle inwardly toward one another to define a generally V-shaped configuration, and said connecting structure including a connecting plate which extends between and creates a sliding wedge-cooperating engagement with the opposed pair of cantilevered flanges, and said screw projecting through said connecting plate and co-acting therewith to effect drawing of the opposed inclined flanges toward one another to effect clamping engagement of the tabs with the rails.

16. A wall panel according to claim 1, wherein said first gusset member is engagable to said first and second rails in the absence of said second gusset member to maintain said first and second rails in initial engagement, and said second gusset member is engagable to said first and second rails with said first gusset member engaged with said first and second rails in said initial engagement.

17. A wall panel according to claim 1, wherein said upright rails and said top and bottom rails have opposite rail faces on opposite sides of said frame, wherein said gusset structure maintains said opposite rail faces substantially coplanar with each other.

18. A wall panel according to claim 17, wherein said first and second slots in said rows are formed through said upright rails proximate said opposite side faces, and said fingers project inwardly into said first and second slots from an exterior side of said side faces.

19. In an upright space-dividing wall panel having an upright rigid frame, said frame having a rectangular ring-shaped configuration defined by a pair of sidewardly spaced and generally parallel elongated upright rails, and generally parallel and vertically spaced cross rails extending generally horizontally between said upright rails wherein said upright rails and said cross rails are joined together by corner connections, and a detachable gusset structure rigidly joining one end of each said cross rail to a respective one of said upright rails to define a respective one of said corner connections, comprising the improvement wherein:

said gusset structure comprising a pair of first and second gusset members positioned in sidewardly adjacent relationship at a corner region between transversely intersecting first and second said rails for rigidly clamping said first and second rails together to define a respective one of said corner connections;

said first and second rails each having a plurality of first and second slots formed therein and respectively disposed within first and second sidewardly-spaced rows which extend in a lengthwise direction of the respective rail;

each said gusset member having first and second rail engaging structures disposed adjacent marginal edge portions thereof which extend in right angled relationship to one another;

each said rail engaging structure including a plurality of outwardly-protruding cantilevered fingers disposed in sidewardly spaced relation and oriented for insertion into the slots associated with one of the rows on one of said first and second rails, each said gusset member including a main body which is vertically oriented when positioned within the respective corner connection between the intersecting first and second rails, and the plurality of cantilevered fingers associated with each of said rail engaging structures being angled sidewardly relative to the vertical orientation of the main body so that the fingers have at least a partial sideward orientation as they project through the respective slots associated with the respective rail, at least said second gusset member being removably engagable with said first and second rails while said first gusset member is disposed in engagement with said intersecting first and second rails;

said first gusset member being positioned at said respective corner connection adjacent one side of said first and second rails so that the fingers on the respective first and second rail engaging structures are engaged within the slots associated solely with the first row of the respective first and second rails;

said second gusset member being positioned at said respective corner connection adjacent the other side of said first and second rails so that the fingers on the respective first and second rail engaging structures are engaged within the slots associated with solely the second row of the respective first and second rails; and said gusset structure including a manually-activated fastening structure co-acting between said pair of sidewardly adjacent gusset members for drawing the gusset members toward one another to cause the fingers on said first and second gusset members to clampingly engage the first and second rails therebetween.

20. A wall panel according to claim 19, wherein said cantilevered fingers associated with said first gusset member of said pair are formed as generally L-shaped hooks, and wherein the cantilevered fingers associated with the second gusset member of said pair are formed as generally straight tabs.

21. A wall panel according to claim 19, wherein each said main body has terminal side edges extending at right angles to each other and respectively defining said first and second rail engaging structures, the cantilevered fingers associated with the first and second gusset members of said pair are formed as generally straight tabs which each project sidewardly along a respective one of said side edges and are insertable from an exterior of said first and second rails into said respective slots thereof so as to be engagable with said slots when said first and second rails are disposed in abutting intersecting relation.

22. A wall panel according to claim 19, wherein the first and second rails are defined by hollow tubes having a generally square cross-section having a hollow interior, each said tube having first and second exterior side walls which define opposite sides of the tube and respectively define opposite exterior side surfaces of the frame, said first and second rows of slots being formed at corners of the first and second exterior side walls respectively and said fingers being inserted into said slots from an exterior thereof such that said fingers project into said hollow interior.

23. In an upright space-dividing wall panel having an upright rigid frame, said frame having a rectangular ring-shaped configuration defined by a pair of sidewardly spaced and generally parallel elongated upright rails, and generally parallel and vertically spaced cross rails extending generally horizontally between said upright rails wherein said upright rails and said cross rails are joined together in abutting intersecting relation by corner connections, and a detachable gusset structure rigidly joining one end of each said cross rail to a respective one of said upright rails to define a respective one of said corner connections, comprising the improvement wherein:

said gusset structure comprising a pair of first and second gusset members positioned in sidewardly adjacent relationship at a corner region between transversely intersecting first and second said rails for rigidly clamping said first and second rails together to define a respective one of said corner connections;

said first and second rails each having a plurality of first and second slots formed therein and respectively disposed within first and second sidewardly-spaced rows which extend in a lengthwise direction of the respective rail;

each said gusset member having first and second rail engaging structures disposed adjacent marginal edge portions thereof which extend in right angled relationship to one another;

each said rail engaging structure including a plurality of outwardly-protruding cantilevered fingers disposed in spaced relation along said marginal edge portion and oriented for insertion into the slots associated with one of the rows on one of said first and second rails wherein said plurality of said fingers of said first rail engaging structure solely engage said slots of said first rail and said plurality of said fingers of said second rail engaging structure solely engage said slots of said second rail;

said first gusset member being positioned at said respective corner connection adjacent one side of said first and second rails so that the fingers on the respective first and second rail engaging structures are engaged within the slots associated solely with the first row of the respective first and second rails;

said second gusset member being positioned at said respective corner connection adjacent the other side of said first and second rails so that the fingers on the respective first and second rail engaging structures are engaged within the slots associated with solely the second row of the respective first and second rails, said fingers of at least said first gusset member being sidewardly projecting tabs which are insertable in said slots of said second row of said first and second rails when said first and second rails are disposed in abutting intersecting relation; and said gusset structure including a manually-activated fastening structure co-acting between said pair of sidewardly adjacent gusset members for drawing the gusset members toward one another to cause the fingers on said first and second gusset members to clampingly engage the first and second rails therebetween.

24. A wall panel according to claim 23, wherein the tabs as associated with said first gusset member have a taper associated with at least one side edge thereof for contacting a respective edge of said slot receiving said tab for effecting a drawing engagement with the respective rail when inserted into the respective slot to draw said first and second rails together.

25. A wall panel according to claim 24, wherein the first and second rails are defined by hollow tubes having a generally square cross-section and hollow interior, each said tube having first and second exterior side walls which define opposite sides of the tube and respectively define opposite exterior side surfaces of the frame, said first and second rows of slots being formed in corners of the first and second exterior side walls respectively and said tabs projecting through said slots into said hollow interior.

* * * * *